(12) United States Patent
Kim

(10) Patent No.: US 12,441,304 B2
(45) Date of Patent: Oct. 14, 2025

(54) DRIVER ASSISTANCE SYSTEM AND VEHICLE INCLUDING THE SAME

(71) Applicant: HL Klemove Corp., Incheon (KR)

(72) Inventor: Jaehwan Kim, Seoul (KR)

(73) Assignee: HL Klemove Corp., Incheon (KR)

( * ) Notice: Subject to any disclaimer, the term of this patent is extended or adjusted under 35 U.S.C. 154(b) by 150 days.

(21) Appl. No.: 18/122,916

(22) Filed: Mar. 17, 2023

(65) Prior Publication Data

US 2023/0294682 A1 Sep. 21, 2023

(30) Foreign Application Priority Data

Mar. 18, 2022 (KR) ........................ 10-2022-0034035

(51) Int. Cl.
*B60W 30/09* (2012.01)
*B60Q 9/00* (2006.01)
(Continued)

(52) U.S. Cl.
CPC ............. *B60W 30/09* (2013.01); *B60Q 9/008* (2013.01); *G06T 7/70* (2017.01); *G06V 20/58* (2022.01); *G06V 20/588* (2022.01); *B60W 2420/403* (2013.01); *B60W 2510/20* (2013.01); *B60W 2520/06* (2013.01); *B60W 2520/10* (2013.01); *B60W 2554/4041* (2020.02);
(Continued)

(58) Field of Classification Search
None
See application file for complete search history.

(56) References Cited

U.S. PATENT DOCUMENTS

| | | | |
|---|---|---|---|
| 2016/0171892 A1* | 6/2016 | Gieseke | G08G 1/096766 |
| | | | 348/148 |
| 2016/0193999 A1* | 7/2016 | Sasabuchi | B60T 7/22 |
| | | | 701/301 |

(Continued)

FOREIGN PATENT DOCUMENTS

| | | |
|---|---|---|
| KR | 10-2018-0124685 A | 11/2018 |
| KR | 10-2019-0067311 A | 6/2019 |

(Continued)

OTHER PUBLICATIONS

KR OA dated Jun. 23, 2025.

*Primary Examiner* — Daniel L Greene
*Assistant Examiner* — Robert L Pinkerton
(74) *Attorney, Agent, or Firm* — Harvest IP Law, LLP

(57) ABSTRACT

Disclosed herein are a driver assistance system and a vehicle including the same. The driver assistance system of the present disclosure includes a camera, an obstacle detector configured to detect an obstacle and output obstacle information about the detected obstacle, and a processor configured to recognize an image of the obstacle based on image information acquired by the camera, obtain a rate of change in size of the recognized image of the obstacle, obtain relative bearing information of the obstacle based on the obstacle information detected by the obstacle detector, determine whether the obstacle and a vehicle are present on a collision path based on the obtained rate of change in size of the image of the obstacle and the relative bearing information of the obstacle, and upon determining that the vehicle and the obstacle are present on the collision path, output a collision risk warning.

19 Claims, 13 Drawing Sheets

(51) Int. Cl.
  *G06T 7/70* (2017.01)
  *G06V 20/56* (2022.01)
  *G06V 20/58* (2022.01)
(52) U.S. Cl.
  CPC .............. *B60W 2554/4042* (2020.02); *B60W 2554/4044* (2020.02); *B60W 2720/10* (2013.01); *B60W 2720/24* (2013.01); *G06T 2207/30244* (2013.01); *G06T 2207/30256* (2013.01); *G06T 2207/30261* (2013.01)

(56) References Cited

U.S. PATENT DOCUMENTS

| | | | | |
|---|---|---|---|---|
| 2017/0113665 | A1* | 4/2017 | Mudalige | G08G 1/163 |
| 2017/0137126 | A1* | 5/2017 | Wong | G05B 6/02 |
| 2017/0328976 | A1* | 11/2017 | Oshima | H04N 7/188 |
| 2019/0039518 | A1* | 2/2019 | Diessner | G02B 3/14 |
| 2020/0384988 | A1* | 12/2020 | Park | G01S 13/87 |
| 2021/0055733 | A1* | 2/2021 | Beller | G05D 1/0088 |
| 2021/0197807 | A1* | 7/2021 | Park | B60W 40/105 |
| 2022/0234578 | A1* | 7/2022 | Das | G08G 1/166 |
| 2022/0262251 | A1* | 8/2022 | Nakagawa | G08G 1/161 |

FOREIGN PATENT DOCUMENTS

| | | |
|---|---|---|
| KR | 10-2021-0083462 A | 7/2021 |
| KR | 10-2316654 B1 | 10/2021 |

\* cited by examiner

DRIVER ASSISTANCE SYSTEM AND VEHICLE INCLUDING THE SAME

CROSS-REFERENCE TO RELATED APPLICATION

This application claims the benefit of Korean Patent Application No. 10-2022-0034035, filed on Mar. 18, 2022 in the Korean Intellectual Property Office, the disclosure of which is incorporated herein by reference.

BACKGROUND

1. Field

Embodiments of the present disclosure relate to a driver assistance system for preventing a collision with an obstacle, and a vehicle including the same.

2. Description of the Related Art

Recently, in order to transmit traveling information of a vehicle to a driver to prevent an accident from occurring due to the driver's carelessness and perform autonomous driving for the driver's convenience, various types of advanced driver assistance systems (ADASs) have been developed.

As an example of an ADAS, there is a technology for detecting a distance to an obstacle near a vehicle using a distance sensor installed in the vehicle and warning a driver of the presence of the obstacle when the detected distance to the obstacle is shorter than or equal to a reference distance.

As another example of an ADAS, there is a technology for determining a risk of collision with an obstacle near a vehicle and notifying a driver of the determined risk of collision.

As still another example of an ADAS, there is an autonomous driving technology for performing autonomous driving to a destination based on road information and current position information and performing autonomous driving to the destination while avoiding obstacles based on a risk of collision with nearby obstacles.

In existing ADASs, a current speed and acceleration of a vehicle are assumed to be maintained, a time-to-collision (TTC) until the vehicle collides with an obstacle was predicted based on the current speed and acceleration of the vehicle and a distance to the obstacle, and a risk of collision with the obstacle was determined based on the predicted TTC.

When nearby obstacles perform various movements different from that of a vehicle in an environment such as a crosswalk or an intersection in the city, there has been a problem that an error in a determined risk of collision with an obstacle increases, and thus there has been a problem that response performance for responding to the risk of collision is also degraded.

SUMMARY

Therefore, it is an aspect of the present disclosure to provide a driver assistance system which determines an actual possibility of collision with an obstacle based on a time-to-collision and the presence or absence of a collision path on a two-dimensional plane, and a vehicle including the same.

It is another aspect of the present disclosure to provide a driver assistance system which determines whether an obstacle is present on a collision path based on obstacle information included in image information and relative bearing information of the obstacle, and a vehicle including the same.

Additional aspects of the disclosure will be set forth in part in the description which follows and, in part, will be obvious from the description, or may be learned by practice of the disclosure.

In accordance with one aspect of the present disclosure, a driver assistance system includes a camera, an obstacle detector configured to detect an obstacle and output obstacle information about the detected obstacle, and a processor configured to recognize an image of the obstacle based on image information acquired by the camera, obtain a rate of change in size of the recognized image of the obstacle, obtain relative bearing information of the obstacle based on the obstacle information detected by the obstacle detector, determine whether the obstacle and a vehicle are present on a collision path based on the obtained rate of change in size of the image of the obstacle and the relative bearing information of the obstacle, and output a collision risk warning upon determining that the vehicle and the obstacle are present on the collision path.

The driver assistance system may further include a communicator. The processor may check position information of the vehicle and traveling speed information of the vehicle received by the communicator, obtain position information and speed information of the obstacle based on the obstacle information detected by the obstacle detector, and obtain a time-to-collision based on the traveling speed information of the vehicle, the position information of the vehicle, and the position information and the speed information of the obstacle.

The time-to-collision may be a time-to-collision on a two-dimensional plane.

The processor may obtain a position vector and a speed vector of the vehicle based on the traveling speed information of the vehicle and the position information of the vehicle, obtain a position vector and a speed vector of the obstacle based on the position information and the speed information of the obstacle, obtain a relative position vector based on the position vector of the vehicle, the speed vector of the vehicle, the position vector of the obstacle, and the speed vector of the obstacle, obtain a relative speed vector based on the obtained relative position vector, and obtain the time-to-collision on the two-dimensional plane based on the obtained relative speed vector and the relative position vector.

The processor may determine whether the obstacle and the vehicle are present on the collision path based on a time-to-collision being less than or equal to a reference collision time.

The processor may determine whether the rate of change in size of the recognized image of the obstacle is greater than or equal to a reference rate of change based on a time-to-collision being less than or equal to a reference collision time. The processor may obtain the relative bearing information of the obstacle upon determining that the rate of change in size of the recognized image of the obstacle is greater than or equal to the reference rate of change.

The processor may determine that the vehicle and the obstacle are present on the collision path based on a relative bearing information of the obstacle being included in reference bearing information.

The processor may determine that the vehicle and the obstacle are not present on the collision path and may limit the collision risk warning based on a relative bearing information of the obstacle being not included in reference bearing information.

The processor may control at least one of a traveling speed and a traveling direction upon determining that the vehicle and the obstacle are present on the collision path during an autonomous driving mode.

In accordance with another aspect of the present disclosure, a vehicle includes a display, a sound output unit, a camera, an obstacle detector configured to detect an obstacle and output obstacle information about the detected obstacle, and a processor configured to recognize an image of the obstacle based on image information acquired by the camera, obtain a rate of change in size of the recognized image of the obstacle, obtain relative bearing information of the obstacle based on the obstacle information detected by the obstacle detector, determine whether the obstacle and a vehicle are present on a collision path based on the obtained rate of change in size of the image of the obstacle and the relative bearing information of the obstacle, and control at least one of the display and the sound output unit to output a collision risk warning upon determining that the vehicle and the obstacle are present on the collision path.

The vehicle may further include a speed detector configured to detect a traveling speed, and a communicator configured to receive current position information. The processor may check position information of the vehicle and traveling speed information of the vehicle received by the communicator, obtain position information and speed information of the obstacle based on the obstacle information detected by the obstacle detector, and obtain a time-to-collision based on the traveling speed information of the vehicle, the position information of the vehicle, and the position information and the speed information of the obstacle.

The vehicle may further include a speed detector configured to detect a traveling speed, and a communicator configured to receive current position information and communicate with the obstacle. The processor may obtain a time-to-collision based on position information and speed information of the obstacle, traveling speed information of the vehicle, and position information of the vehicle which are received by the communicator.

Upon obtaining the time-to-collision, the processor may obtain a position vector and a speed vector of the vehicle based on the traveling speed information of the vehicle and the position information of the vehicle, obtain a position vector and a speed vector of the obstacle based on the position information and the speed information of the obstacle, obtain a relative position vector based on the position vector of the vehicle, the speed vector of the vehicle, the position vector of the obstacle, and the speed vector of the obstacle, obtain a relative speed vector based on the obtained relative position vector, and obtain the time-to-collision on a two-dimensional plane based on the obtained relative speed vector and the relative position vector.

The processor may determine whether the obstacle and the vehicle are present on the collision path based on a time-to-collision being less than or equal to a reference collision time.

The processor may determine whether the rate of change in size of the recognized image of the obstacle is greater than or equal to a reference rate of change based on a time-to-collision being less than or equal to the reference collision time. The processor may obtain the relative bearing information of the obstacle upon determining that the rate of change in size of the recognized image of the obstacle is greater than or equal to the reference rate of change.

The processor may determine that the vehicle and the obstacle are present on the collision path based on a relative bearing information of the obstacle being included in reference bearing information.

The processor may determine that the vehicle and the obstacle are not present on the collision path and may limit the collision risk warning based on a relative bearing information of the obstacle being not included in the reference bearing information.

The vehicle may further include a steering angle detector configured to detect a steering angle. The processor may obtain a traveling direction of the obstacle received by the communicator, obtain a traveling direction of the vehicle based on information detected by the steering angle detector, determine whether the traveling direction of the vehicle and the traveling direction of the obstacle are the same based on a relative bearing information of the obstacle being included in the reference bearing information, and determine that the obstacle is not present on the collision path based on a traveling direction of the vehicle being different from the traveling direction of the obstacle.

The vehicle may further include a steering angle detector configured to detect a steering angle. The processor may obtain a traveling direction of the obstacle received by the communicator, obtain a traveling direction of the vehicle based on information detected by the steering angle detector, determine whether an expected lane corresponding to the traveling direction of the vehicle and an expected lane corresponding to the traveling direction of the obstacle are the same based on a relative bearing information of the obstacle being included in the reference bearing information, and determine that the obstacle is present on the collision path upon determining that the expected lane of the vehicle and the expected lane of the obstacle are the same.

The vehicle may further include a steering device, and a braking device. The processor controls at least one of the steering device and the braking device upon determining that the vehicle and the obstacle are present on the collision path during an autonomous driving mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
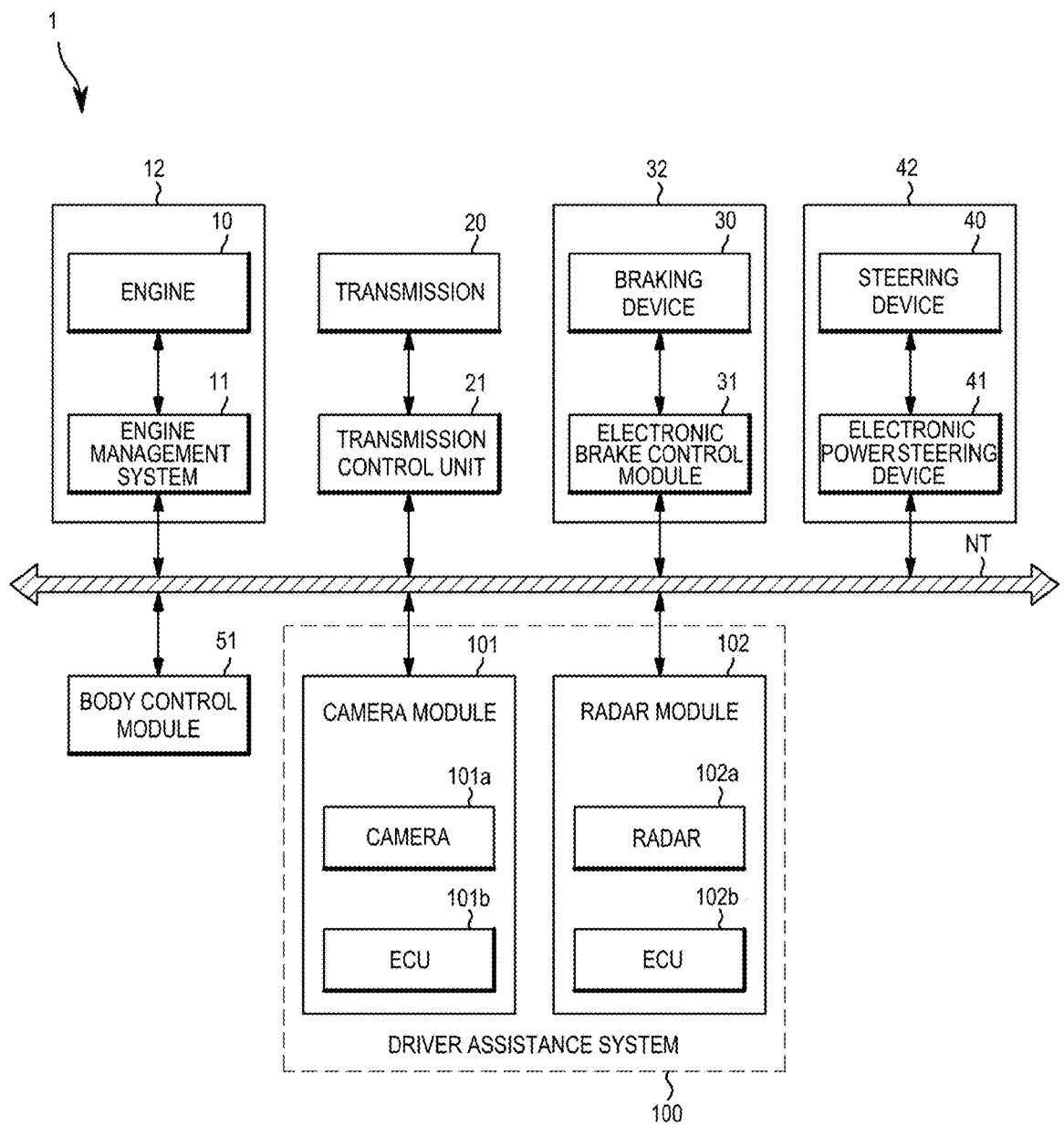
FIG. 1 is a block diagram of a vehicle according to an embodiment.

Like reference numerals refer to like elements throughout the specification. Not all elements of embodiments of the present disclosure will be described, and description of elements commonly known in the art or that overlap each other in the embodiments will be omitted.

Terms as used throughout the specification such as "part," "module," "member," and "block" may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" to another element, it can be directly or indirectly connected to the other element, wherein the indirect connection includes "connection via a wireless communication network."

When a part "includes" or "comprises" an element, unless there is a particular description to the contrary, the part may further include other elements, rather than such other elements being excluded.

Throughout the present specification, the term "on" that is used to designate a position of one element with respect to another element includes both a case where the one element is adjacent to another element and a case where there is still another element between the two elements.

Terms "first," "second," and the like are used to differentiate a certain element from another element, but elements should not be construed to be limited by the terms.

A singular expression includes a plural expression unless the context clearly indicates otherwise.

An identification code is used for convenience of the description but is not intended to illustrate the order of operations. The operations may be implemented in an order different from the illustrated order unless the context clearly indicates otherwise.

The principle and embodiments of the present disclosure will now be described with reference to the accompanying drawings.

FIG. 1 is a block diagram of a vehicle according to an embodiment.

The vehicle according to the embodiment may be an internal combustion engine vehicle or an eco-friendly vehicle In the present embodiment, among internal combustion engine vehicles, an example of a vehicle performing a collision warning mode will be described.

As shown in FIG. 1, a vehicle 1 includes an engine 10, a transmission 20, a braking device 30, and a steering device 40.

The engine 10 may include a cylinder and a piston and may generate power for driving the vehicle 1.

The transmission 20 may include a plurality of gears and may transmit power generated by the engine 10 to wheels.

The braking device 30 may decelerate or stop the vehicle 1 through friction with the wheels.

The steering device 40 may change a traveling direction of the vehicle 1.

The vehicle 1 may include a plurality of electronic components.

For example, the vehicle 1 further includes an engine management system (EMS) 11, a transmission control unit (TCU) 21, an electronic brake control module 31, an electronic power steering (EPS) device 41, a body control module (BCM), and a driver assistance system (DAS).

The EMS 11 may control the engine 10 in response to an acceleration intention of a driver conveyed through an accelerator pedal or a request from a DAS 100. For example, the EMS 11 may control torque of the engine 10.

The TCU 21 may control the transmission 20 in response to a shift command of a driver through a shift lever (also referred to as a gear lever, a shifting lever, or a gear shift) and/or a traveling speed of the vehicle 1. For example, the TCU 21 may adjust a transmission ratio from the engine 10 to the wheels.

The electronic brake control module 31 may control the braking device 30 in response to a breaking intention of a driver conveyed through a brake pedal and/or slip of the wheels. For example, the electronic brake control module 31 may temporarily release braking of the wheel in response to slip of the wheel detected during braking of the vehicle 1 (anti-lock braking system (ABS)).

The electronic brake control module 31 may selectively release braking of the wheel in response to oversteering and/or understeering detected during steering of the vehicle 1 (electronic stability control (ESC)).

In addition, the electronic brake control module 31 may temporarily brake the wheel in response to slip of the wheel detected during driving of the vehicle 1 (traction control system (TCS)).

The EPS device 41 may assist with the operation of the steering device 40 in response to a steering intention of a driver through a steering wheel such that the driver may easily operate the steering wheel. For example, the EPS device 41 may assist with the operation of the steering device 40 to reduce a steering force during low-speed traveling or parking and may increase a steering force during high-speed traveling.

The BCM 51 may control the operation of the electronic components which provide convenience to a driver or ensure the safety of the driver. For example, the BCM 51 may control head lamps, wipers, clusters, multi-function switches, and direction-indicating lamps.

The DAS 100 may assist the driver in operating (driving, braking, and steering) the vehicle 1. For example, the DAS 100 may detect an environment around the vehicle 1 (for example, other vehicles, pedestrians, cyclists, lanes, road signs, traffic lights, or the like) and may control driving and/or braking and/or steering of the vehicle 1 based on the detected environment.

The DAS 100 may perform a manual driving mode in which traveling is performed in response to a driving intention of a user and may perform a function of warning of a risk of collision with an obstacle during the manual driving mode.

The DAS 100 may provide various functions to a driver. For example, the DAS 100 may provide a lane departure warning (LDW), lane keeping assist (LKA), high beam assist (HBA), autonomous emergency braking (AEB), traffic sign recognition (TSR), smart cruise control (SCC), blind spot detection (BSD), and the like.

The DAS 100 may perform an autonomous driving mode of allowing the vehicle itself to recognize a road environment, determine obstacles and traveling conditions, and avoid the obstacles, and controlling traveling of the vehicle according to a planned traveling path to allow the vehicle to travel to a destination.

The DAS 100 includes a camera module 101 which acquires image data around the vehicle 1 and a radar module 102 which acquires obstacle data around the vehicle 1.

The camera module 101 may include a camera 101a and a controller (electronic control unit (ECU)) 101b and may photograph a view near the vehicle 1 and recognize other vehicles, pedestrians, cyclists, lanes, road signs, traffic lights, or the like.

The radar module 102 may include a radar 102a and a controller 102b and may acquire relative positions, relative speeds, or the like of obstacles (for example, other vehicles, pedestrians, cyclists, or the like) near the vehicle 1.

The above electronic components may communicate with each other through a vehicle communication network NT. For example, the electronic components may transmit and receive data through Ethernet, Media Oriented Systems Transport (MOST), FlexRay, a controller area network (CAN), or a local interconnect network (LIN).

The DAS 100 may transmit a driving control signal, a braking signal, and a steering signal to the EMS 11, the electronic brake control module 31, and the EPS device 41 through the vehicle communication network NT, respectively.

Figure 2:
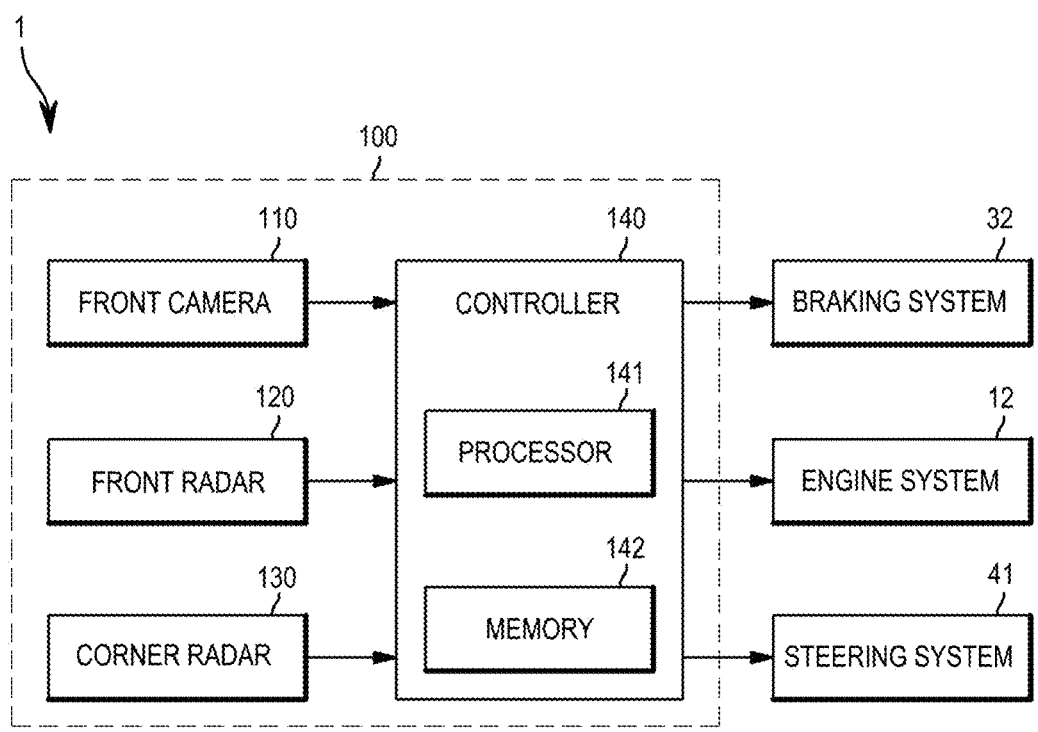
FIG. 2 is a block diagram of a driver assistance system provided in a vehicle according to an embodiment.
Figure 3:
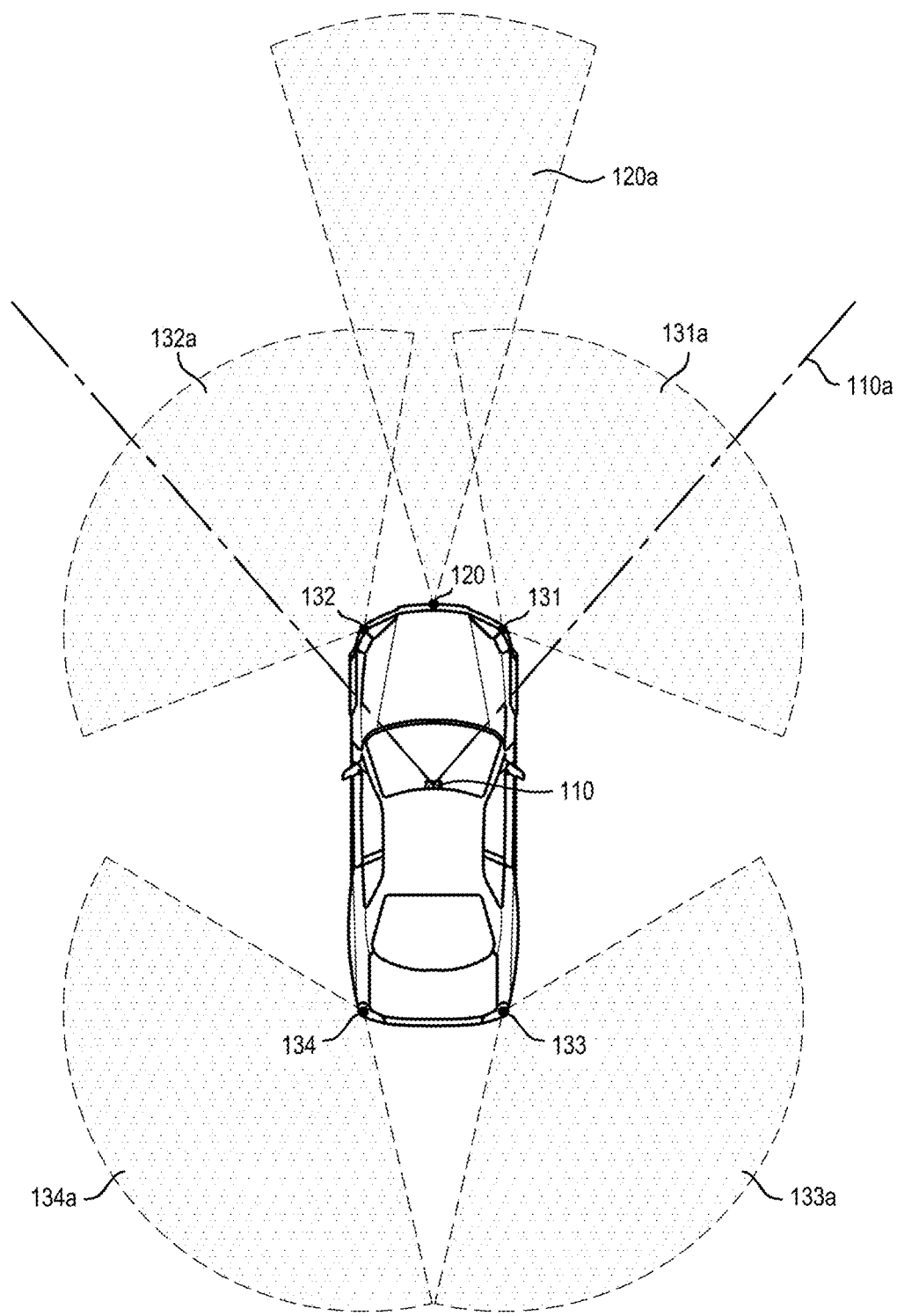
FIG. 3 is an exemplary diagram of detection areas of a camera and a radar included in a driver assistance system of a vehicle according to an embodiment.

FIG. 2 is a block diagram of a DAS provided in a vehicle according to an embodiment. FIG. 3 is an exemplary diagram of detection areas of a camera and a radar included in a DAS of a vehicle according to an embodiment.

As shown in FIG. 2, a vehicle 1 may include a braking system 32, an engine system 12, a steering system 42, and a DAS 100.

The engine system 12 may include the EMS 11 and the engine 10 described with reference to FIG. 1. The braking system 32 may include the electronic brake control module 31 (see FIG. 1) and the braking device 30 (see FIG. 1) described with reference to FIG. 1. The steering system 42 may include the EPS device 41 (see FIG. 1) and the steering device 40 (see FIG. 1).

The DAS 100 of the present embodiment may include a front camera 110 as a camera of a camera module 101 and may include a front radar 120 and a plurality of corner radars 130 (131, 132, 133, and 134) as radars of a radar module 102.

As shown in FIG. 3, the DAS 100 may include the front camera 110, the front radar 120, and the plurality of corner radars 130 to secure a field of view 110a facing a front direction of the vehicle 1.

The front camera 110 may be installed, for example, on a front windshield of the vehicle 1.

The front camera 110 may photograph a view in front of the vehicle 1 and may acquire image data of the view in front of the vehicle 1. The image data of the view in front of the vehicle 1 may include position information about at least one of other vehicles, pedestrians, cyclists, lanes, curbs, guardrails, street trees, and street lights positioned in front of the vehicle 1.

The front camera 110 may include a plurality of lenses and an image sensor. The image sensor may include a plurality of photodiodes that convert light into an electrical signal, and the plurality of photodiodes may be disposed in the form of a two-dimensional matrix.

The front camera 110 may be electrically connected to a controller 140. For example, the front camera 110 is connected to the controller 140 through a vehicle communication network NT, may be connected to the controller 140 through a hard wire, or may be connected to the controller 140 through a printed circuit board (PCB).

The front camera 110 may transfer the image data of the view in front of the vehicle 1 to the controller 140.

The front radar 120 may have a field of sensing 120a facing forward from the vehicle 1. The front radar 120 may be installed, for example, on a grill or bumper of the vehicle 1.

The front radar 120 may include a transmitting antenna (or a transmitting antenna array) for radiating transmission radio waves forward from the vehicle 1, and a receiving antenna (or a receiving antenna array) for receiving reflected radio waves reflected from an obstacle.

The front radar 120 may acquire front radar data from transmission waves transmitted by the transmitting antenna and reflected waves received by the receiving antenna.

The front radar data may include position information and speed information related to other vehicles, pedestrians, or cyclists positioned in front of the vehicle 1.

The front radar 120 may calculate a relative distance to an obstacle based on a phase difference (or a time difference) between transmission radio waves and reflected radio waves and may calculate a relative speed of the obstacle based on a frequency difference between the transmission radio waves and the reflected radio waves.

The front radar 120 may be connected to the controller 140 through, for example, the vehicle communication network NT, a hard wire, or a PCB. The front radar 120 may transfer the front radar data to the controller 140.

The plurality of corner radars 130 include a first corner radar 131 installed at a front right side of the vehicle 1, a second corner radar 132 installed at a front left side of the vehicle 1, a third corner radar 133 installed at a rear right side of the vehicle 1, and a fourth corner radar 134 installed at a rear left side of the vehicle 1.

The first corner radar 131 may have a field of sensing 131a facing a front-right direction of the vehicle 1. The first corner radar 131 may be installed at a right side of a front bumper of the vehicle 1.

The second corner radar 132 may have a field of sensing 132a facing a front-left direction of the vehicle 1 and may be installed at a left side of the front bumper of the vehicle 1.

The third corner radar 133 may have a field of sensing 133a facing a rear-right direction of the vehicle 1 and may be installed at a right side of a rear bumper of the vehicle 1.

The fourth corner radar 134 may have a field of sensing 134a facing a rear-left direction of the vehicle 1 and may be installed at a left side of the rear bumper of the vehicle 1.

Each of the first, second, third, and fourth corner radars 131, 132, 133, and 134 may include a transmitting antenna and a receiving antenna.

The first, second, third, and fourth corner radars 131, 132, 133, and 134 may acquire first corner radar data, second corner radar data, third corner radar data, and fourth corner radar data, respectively.

The first corner radar data may include distance information and speed information related to other vehicles, pedestrians, or cyclists (hereinafter referred to as "obstacles") positioned in the front-right direction of the vehicle 1.

The second corner radar data may include distance information and speed information related to obstacles positioned in the front-left direction of the vehicle 1.

The third corner radar data and the fourth corner radar data may include distance information and speed information of obstacles positioned in the rear-right direction of the vehicle 1 and the rear-left direction of the vehicle 1.

Each of the first, second, third, and fourth corner radars 131, 132, 133, and 134 may be connected to the controller 140 through the vehicle communication network NT, a hard wire, or a PCB. The first, second, third, and fourth corner radars 131, 132, 133, and 134 may transmit the first corner radar data, the second corner radar data, the third corner radar data, and the fourth corner radar data to the controller 140, respectively.

The controller 140 may include a controller 101b (see FIG. 1) of a camera module 101 (see FIG. 1), a controller 102b (see FIG. 1) of a radar module 102 (see FIG. 1), and/or a separate integrated controller.

The controller 140 includes a processor 141 and a memory 142.

The processor 141 may process front image data of the front camera 110, front radar data of the front radar 120, and corner radar data of the plurality of corner radars 130 and may generate an acceleration signal, a braking signal, and a steering signal for controlling the engine system 12, the braking system 32, and the steering system 42.

For example, the processor 141 may include an image signal processor which processes front image data of the front camera 110, a digital signal processor which processes radar data of the radars 120 and 130, and a micro control unit (MCU) which generates a driving signal and a steering signal.

The processor 141 may detect obstacles (for example, other vehicles, pedestrians, cyclists, curbs, guardrails, street trees, street lights, or the like) in front of the vehicle 1 based on front image data of the front camera 110 and front radar data of the front radar 120.

Specifically, the processor 141 may acquire position information (distance and direction) and speed information (relative speed) of obstacles in front of the vehicle 1 based on front radar data of the front radar 120. Based on front image data of the front camera 110, the processor 141 may acquire position information (direction) and type information of an obstacle in front of the vehicle 1 (for example, whether the obstacle is the other vehicle, a pedestrian, a cyclist, a curb, a guardrail, a street tree, or a street light, or the like).

In addition, the processor 141 may match obstacles detected based on front image data with obstacles detected based on front radar data and may acquire type information, position information, and speed information of obstacles in front of the vehicle 1 based on matching results.

During an autonomous driving mode, the processor 141 may generate an acceleration signal, a braking signal, and a steering signal based on type information, position information, and speed information of obstacles in front and may allow the vehicle to autonomously travel to a destination based on the generated acceleration signal, braking signal, and steering signal.

For example, the processor 141 may calculate a time to collision (TTC), which is a time until the vehicle 1 collides with an front obstacle, based on position information (relative distance) and speed information (relative speed) of the front obstacle and may warn a driver of a risk of the collision, transmit a braking signal to the braking system 32, or transmit a steering signal to the steering system 42 based on a comparison result between the calculated TTC and a preset reference time.

The processor 141 may transmit a steering signal to the steering system 42 based on direction information among position information of the front obstacle.

As another example, the processor 141 may calculate a distance to collision (DTC), which is a distance until the vehicle collides with a front obstacle, based on speed information (that is, a relative speed) of the front obstacle and may warn a driver of the collision or transmit a braking signal to the braking system 32 based on a comparison result between the calculated DTC and a distance to the front obstacle.

The processor 141 may acquire position information (distance and direction) and speed information (relative speed) of obstacles at sides (front right side, front left side, rear right side, and rear left side) of the vehicle 1 based on corner radar data of the plurality of corner radars 130.

The memory 142 may store programs and/or data for processing image data by the processor 141, programs and/or data for processing radar data by the processor 141, and programs and/or data for generating a braking signal and a steering signal by the processor 141.

The memory 142 may temporarily store image data received from the front camera 110 and/or radar data received from the radars 120 and 130 and may temporarily store processing results of image data and/or radar data by the processor 141.

The memory 142 may include not only volatile memories such as a static random access memory (SRAM) and a dynamic random access memory (DRAM) but also non-volatile memories such as a flash memory, a read only memory (ROM), and an erasable programmable ROM (EPROM), and the like.

A specific configuration of a vehicle provided with a DAS for warning a user of a risk of collision based on a TTC, which is a time until the vehicle collides with a nearby obstacle, will be described with reference to FIG. 4.

Figure 4:
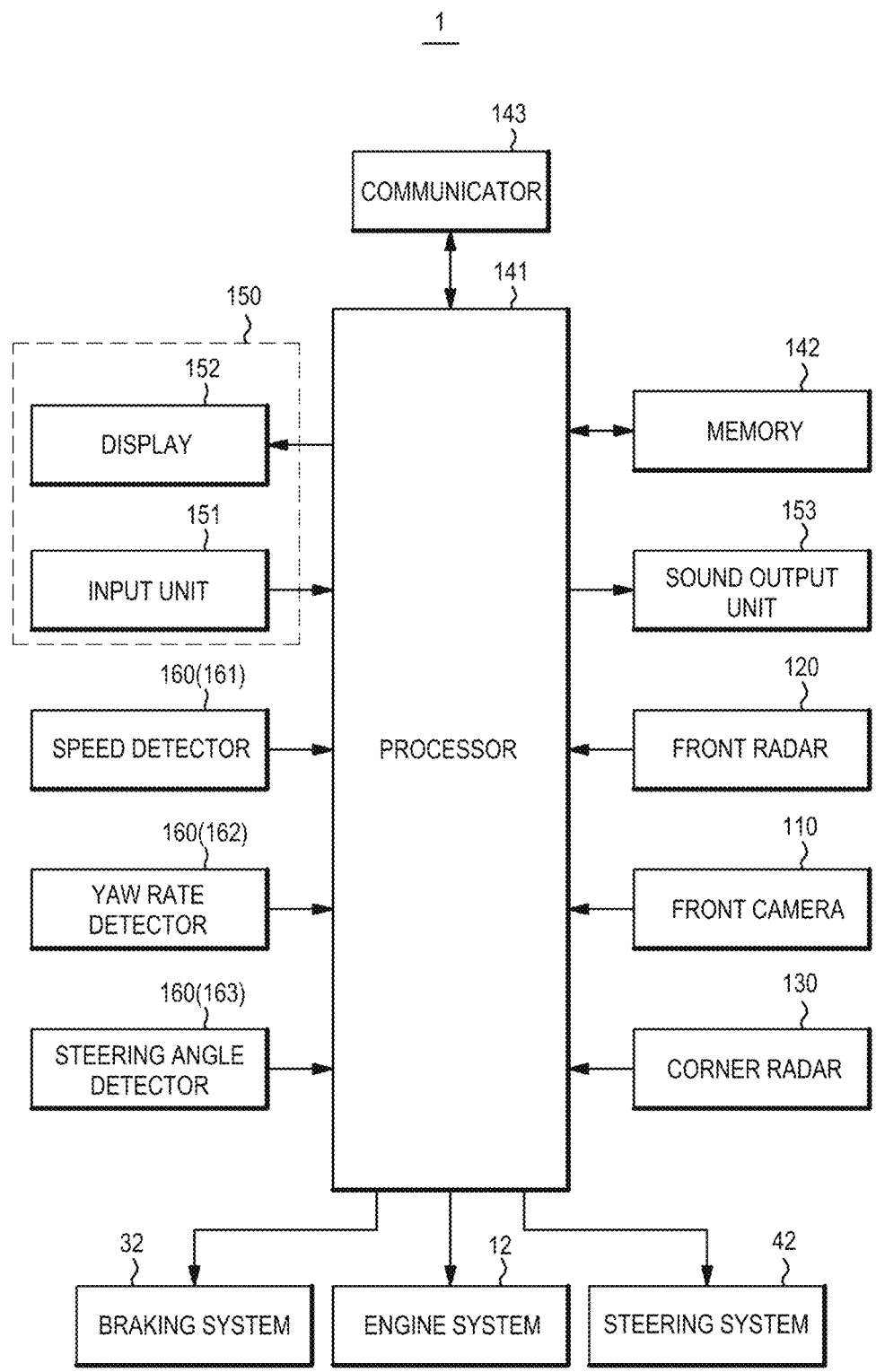
FIG. 4 is a detailed control block diagram of a vehicle equipped with a driver assistance system according to an embodiment.

FIG. 4 is a detailed control block diagram of a vehicle equipped with a DAS according to an embodiment.

A vehicle 1 may include an engine system 12, a braking system 32, a steering system 42, a DAS 100, a user interface 150, and a traveling information detector 160.

The engine system 12, the braking system 32, and the steering system 42 have been described with reference to FIGS. 1 and 2, and thus descriptions thereof are omitted.

A configuration of a processor 141 of the DAS 100 will be described below.

In addition to the components shown in FIG. 2, the DAS 100 may further include a communicator 143.

The communicator 143 may communicate with various electronic devices in the DAS 100 and may also communicate with various electronic devices in the vehicle 1.

The communicator 143 may include one or more components for establishing communication with an external device and may include, for example, at least one of a short-distance communication module, a wired communication module, and a wireless communication module.

The short-range communication module may include various short-range communication modules such as a Bluetooth module, an infrared communication module, a radio frequency identification (RFID) communication module, a wireless local access network (WLAN) communication module, a near field communication (NFC) module, and a ZigBee communication module which transmit and receive signals using a wireless communication network at a short distance.

The wired communication module may include various wired communication modules such as a controller area network (CAN) communication module, a local area network (LAN) module, a wide area network (WAN) module, and a value added network (VAN) module as well as various cable communication modules such as a Universal Serial Bus (USB), a High Definition Multimedia Interface (HDMI), a Digital Visual Interface (DVI), Recommended Standard 232 (RS-232), power line communication, and a plain old telephone service (POTS).

In addition to a WiFi module and a WiBro module, the wireless communication module may include wireless communication modules which support various wireless communication methods such as Global System for Mobile Communications (GSM), code division multiple access (CDMA), wideband code division multiple access (WCDMA), Universal Mobile Telecommunications System (UMTS), time division multiple access (TDMA), and Long Term Evolution (LTE).

The communicator 143 may be provided in each of the DAS 100 and the vehicle 1, and the communicator 143 of the DAS 100 and the communicator provided in the vehicle 1 (that is, a communication network NT) may communicate with each other.

The communicator 143 may further include a position receiver (not shown).

The position receiver receives position information corresponding to a current position of the vehicle which is traveling or stopping.

The position receiver may include a Global Positioning System (GPS) receiver. Here, the GPS receiver includes an antenna module for receiving signals from a plurality of GPS satellites and a signal processor.

The signal processor includes software for obtaining a current position using a distance and time information corresponding to position signals of the plurality of GPS satellites and a transmitter for transmitting acquired position information of the vehicle.

The communicator 143 may establish communication (vehicle to infrastructure (V2I) communication) between the vehicle 1 and an infrastructure (not shown) and may establish communication (vehicle to vehicle (V2V) communication) with the other vehicle.

When the vehicle communicates with the other vehicle, the communicator 143 may receive identification information, position information, acceleration information, and traveling speed information of the other vehicle and may further receive destination information and path information.

When the vehicle communicates with a server or an infrastructure, the communicator 143 may receive identification information, position information, acceleration information, and traveling speed information of the other vehicle and may further receive destination information and path information.

A front camera 110, a front radar 120, and a corner radar 130 may be components provided in the DAS 100 and may also be components provided in the vehicle 1 to transmit or receive information to or from the DAS 100 through communication.

The front camera 110 detects a road and object information around the vehicle 1 and converts the detected road and object information into an electrical image signal, detects an environment outside the vehicle, particularly a road on which the vehicle is traveling, and object information in front of the vehicle at a current position of the vehicle, and transmits an image signal of the detected road and object information to the processor 141. Here, the image signal may include images of a road in a forward direction based on a traveling direction of the vehicle and images of roads at both sides of the road in the forward direction.

The front camera 110 may include a charge coupled device (CCD) or a complementary metal-oxide semiconductor (CMOS) image sensor.

In addition to the front camera, the vehicle 1 may further include a rear camera and a side camera.

The rear camera also acquires an image of a view to the rear of the vehicle 1 and transmits the acquired image of the rear view to the processor 141. The side camera also acquires an image of a view to the side of the vehicle 1 and transmits the acquired image of the side view to the processor 141. Thus, the processor 141 may recognize other vehicles beside and behind the vehicle 1.

The front radar 120 and the corner radar 130 may be obstacle detectors for detecting obstacles. The front radar 120 and the corner radar 130 have been described with reference to FIG. 3, and thus descriptions thereof are omitted.

The obstacle detector detects obstacles in front of and to the left and right of the vehicle 1 and transmits obstacle information about the detected obstacles to the processor 141. Here, the obstacle information may include position information of an obstacle, and the position information of the obstacle may include distance information about a distance to the obstacle and direction information of the obstacle. The distance information about the distance to the obstacle may be distance information about a relative distance to the obstacle.

In addition to the front radar 120 and the corner radar 130, the vehicle 1 may further include at least one of a light detection and ranging (LiDAR) sensor and an ultrasonic sensor and may further include at least one camera as obstacle detectors.

The LiDAR sensor is a non-contact distance detection sensor using a principle of a laser radar. The LiDAR sensor may include a transmitter for transmitting a laser beam and a receiver for receiving a laser beam that is reflected and returned from a surface of an object within a sensor range.

The ultrasonic sensor generates ultrasonic waves for a certain time and then detects a signal that is reflected and returned from an object. The ultrasonic sensor may be used to determine the presence or absence of an obstacle such as a pedestrian within a short range.

The user interface 150 may include an input unit 151 for receiving a user input and a display 152 for displaying various types of information.

The user interface 150 may be a vehicle terminal (audio video navigation (AVN) device) which performs at least one of a radio function, an audio function, a video function, a map display function, a navigation function, a digital multimedia broadcasting (DMB) function, a content playback function, and an Internet search function.

The input unit 151 may receive an on/off command of a collision risk notification mode of providing a notification of a possibility of collision with an obstacle.

The input unit 151 may receive a command for turning on an autonomous driving mode and a command for turning off the autonomous driving mode and may transmit signals corresponding to the received commands to the processor 141.

The input unit 151 may receive a command for operating any one function among functions that may be performed in the vehicle 1. For example, the input unit 151 may receive a command for operating at least one of the radio function, the audio function, the video function, the map display function, the navigation function, the DMB function, the content playback function, and the Internet search function.

The input unit 151 may also receive a target traveling speed for performing an autonomous driving mode.

The input unit 151 may be provided in a head unit or center fascia of the vehicle 1 or may be provided in the vehicle terminal 150. The input unit 151 may be provided as a button, a key, a switch, an operation lever, a jog dial, or the like or may be provided as a touch pad.

The display 152 displays operation information about a function that is being performed in the vehicle 1 or the user interface 150. For example, the display 152 may display information related to a phone call, may display content information output through the user interface 150, may display information related to music playback, or may also display external broadcasting information.

During a navigation mode, the display 152 may display map information, and may display map information and road guidance information matched with a path to a destination.

The display 152 may display on/off information about a collision risk notification mode.

The display 152 may display an image of a road or may display position information of a pedestrian and position information of the other vehicle.

The display 152 may display collision risk information for providing a notification regarding a collision with an obstacle as an image.

The display 152 may also display acceleration information, deceleration information, and steering information for avoiding an obstacle as images.

The display 152 may also display traveling information about a target traveling speed and an actual traveling speed in an autonomous driving mode.

The display 152 may be a lamp such as a light-emitting diode (LED) or a flat display device such as a liquid crystal display (LCD).

When the input unit 151 includes a touch panel, the display 152 may be provided as a flat or curved touch screen provided integrally with the touch panel.

The user interface 150 may further include a sound output unit 153.

In response to a control command of the processor 141, the sound output unit 153 may output operation information and guidance information about functions being performed in the vehicle 1 or the user interface 150 as sounds. For example, when a navigation mode is performed, the sound output unit 153 may output a sound for road guidance in response to a control command of the processor 141.

The sound output unit 153 may output warning information as a sound to provide a notification of a risk of collision with an obstacle. The sound output unit 153 may be provided as one or more speakers.

The sound output unit 153 outputs a sound at a level corresponding to a control command of the processor 141.

The vehicle 1 may include a traveling information detector 160 which detects traveling information of the vehicle such as traveling speed information, traveling direction information, acceleration information, yaw rate information, deceleration information, and acceleration information.

The traveling information detector 160 may include a speed detector 161, a yaw rate detector 162, and a steering angle detector 163.

The speed detector 161 may include a plurality of wheel speed sensors. The speed detector 161 may include an acceleration sensor. The speed detector 161 may include the plurality of wheel speed sensors and the acceleration sensor.

When the speed detector 161 includes the acceleration sensor, the processor 141 may obtain acceleration of the vehicle 1 based on information detected by the acceleration sensor and may also obtain a traveling speed of the vehicle 1 based on the obtained acceleration.

When the speed detector 161 includes the acceleration sensor and the plurality of wheel speed sensors, the processor 141 may obtain acceleration of the vehicle 1 based on information detected by the acceleration sensor and may also obtain a traveling speed of the vehicle 1 based on speed information acquired by the plurality of wheel speed sensors.

The yaw rate detector 162 detects a yaw moment of the vehicle 1. A rotational angular speed, which is a yaw rate in a vertical axis direction of the vehicle, is detected.

The yaw rate detector 162 may be provided on a chassis of the vehicle 1 and may be provided at a lower portion of a center console or on a driver seat, but the present disclosure is not limited to such positions.

The steering angle detector 163 detects an angular speed of a steering wheel for detecting a steering angle of the vehicle 1. That is, the steering angle detector 163 may include an angular speed detector.

Hereinafter, a configuration of the processor 141 will be described with reference to FIGS. 5, 6A, 6B, 7A, 7B, 7C, and 7D.

The processor 141 may control execution of an autonomous driving mode in response to a command for turning on the autonomous driving mode.

During the autonomous driving mode, the processor 141 may check destination information input by the input unit 151, may check current position information received by the position receiver, may set the checked current position information as departure point information, may search for a path from a departure point to a destination based on the departure point information and the destination information, may acquire road guidance information for a path that it finds, and may control the display 152 to display navigation information, with which map information, the departure point information, the destination information, path information, and the road guidance information are matched, as an image.

During the autonomous driving mode, the processor 141 may control traveling based on the navigation information, and based on acquired traveling speed information and target traveling speed information, the processor 141 may control a speed of the vehicle such that the vehicle travels at a target traveling speed. Here, the target traveling speed information may be preset traveling speed information or may be target traveling speed information input by a user.

Acquiring traveling speed information of the vehicle may include acquiring a traveling speed of the vehicle based on detection information output from the plurality of wheel speed sensors.

Acquiring traveling speed information of the vehicle may include acquiring acceleration information based on detection information output from the acceleration sensor and acquiring a traveling speed of the vehicle based on the acquired acceleration information.

Acquiring traveling speed information of the vehicle may include acquiring a traveling speed of the vehicle based on detection information output from the plurality of wheel speed sensors and detection information output from the acceleration sensor.

The processor 141 may recognize obstacles in front of and beside the vehicle 1 based on image information of the front camera 110, front radar information of the front radar 120, and corner radar information of the corner radar 130 and may obtain speed information, position information, and type information of the recognized obstacles (for example, information about whether the obstacles are other vehicles, pedestrians, cyclists, curbs, guardrails, street trees, or street lights).

The position information of the obstacles may include relative distance information and relative direction information with respect to the vehicle 1, and the speed information may include a relative speed.

The processor 141 may predict movement of obstacles around the vehicle 1 based on the speed information, the position information, and the type information of the recognized obstacles.

Nearby obstacles include the other vehicle traveling in the same lane as the vehicle 1 and traveling in front of the vehicle 1, the other vehicle traveling in a lane to the left of the vehicle 1, and a vehicle traveling in a lane to the right of the vehicle 1.

Nearby obstacles may be vehicles of which a relative distance to the vehicle 1 is less than or equal to a reference distance and of which a relative speed with respect to the vehicle 1 is less than or equal to a reference speed. Here, the reference speed may differ according to a type of a road or a traffic condition of the road.

Nearby obstacles may be obstacles positioned adjacent to a following lane.

When image information of a road is received during the autonomous driving mode, the processor 141 processes an image to recognize a lane of the road, recognizes a host vehicle lane in which a host vehicle travels and neighboring lanes based on position information of the recognized lane, generates a following lane based on lane information and path information for the recognized host vehicle lane, and controls autonomous driving based on position information and obstacle information of the generated following lane.

Such a following lane is a line through which a center of a chassis of a vehicle follows a lane at any position of the lane. Here, any position of the lane may be a position of any one of two lanes constituting a road or a central position of the two lanes.

When lateral avoidance is performed based on generated position information of an avoidance lane, the processor 141 may determine a possibility of collision with an obstacle, and when it is determined that there is a possibility of collision with an obstacle, the processor 141 may generate a braking signal based on motion information of the obstacle and may transmit the generated braking signal to the braking system 32.

The processor 141 may also generate a steering signal for avoiding an obstacle and may also control the output of collision risk information.

In response to a possibility of collision with an obstacle, the processor 141 may perform control based on position information of the obstacle and speed information of the obstacle among motion information of the obstacle and acquired traveling speed information of the vehicle such that the vehicle travels while adjusting a traveling speed.

During the autonomous driving mode, the processor 141 may acquire obstacle information by processing image information of the front camera 110 and radar information of the front radar and corner radar, may generate a braking signal and a steering signal based on navigation information and the obstacle information, and may generate a power signal. That is, during the autonomous driving mode, the processor 141 controls at least one of braking, acceleration, and steering to a destination to allow a vehicle to autonomously travel to the destination.

As an example, the processor 141 may obtain a TTC, which is a time until the vehicle 1 collides with a front obstacle, based on position information (relative distance) and speed information (relative speed) of the front obstacle and may warn a driver of a risk of the collision, generate a braking signal, or generate a steering signal based on a comparison result between the obtained TTC and a preset reference time.

As another example, the processor 141 may obtain a DTC, which is a distance until the vehicle 1 collides with a front obstacle, based on speed information (that is, a relative speed) of the front obstacle and may warn a driver of the collision or generate a braking signal based on a comparison result between the obtained DTC and a distance to the front obstacle.

The processor 141 may control at least one of the engine system 12, the braking system 32, and the steering system 42 based on an acceleration signal, a deceleration signal, and a steering signal.

When a command for turning on a manual driving mode is received, based on operation information of a shift lever, steering angle information of the steering wheel, pressure information of a brake pedal, and pressure information of an accelerator pedal which correspond to a user input, the processor 141 may control a traveling speed and a traveling direction of the vehicle and may control stopping of the vehicle.

While traveling is controlled in response to the command for turning on the manual driving mode, when a command for turning on a collision risk warning mode is received, the processor 141 may detect nearby obstacles, may determine a risk of collision with the detected obstacles, and may control the output of a warning based on the determined risk of collision.

When it is determined that there is a possibility of collision, in order to respond to the risk of collision with an obstacle, the processor 141 may control power of external lamps (for example, emergency lights) or may control sound output of the sound output unit 153.

When it is determined that there is a possibility of collision with an obstacle, the processor 141 may output a collision warning notification through the user interface 150 by transmitting notification information about the possibility of the collision to the user interface 150.

An obstacle may be the other vehicle. The other vehicle may be a nearby vehicle within a preset radius based on a position of the vehicle.

A configuration of the processor for determining a possibility of collision with the other vehicle will be described in more detail with reference to FIGS. 5, 6, 7A, 7B, 7C, 7D, and 7E.

Figure 5:
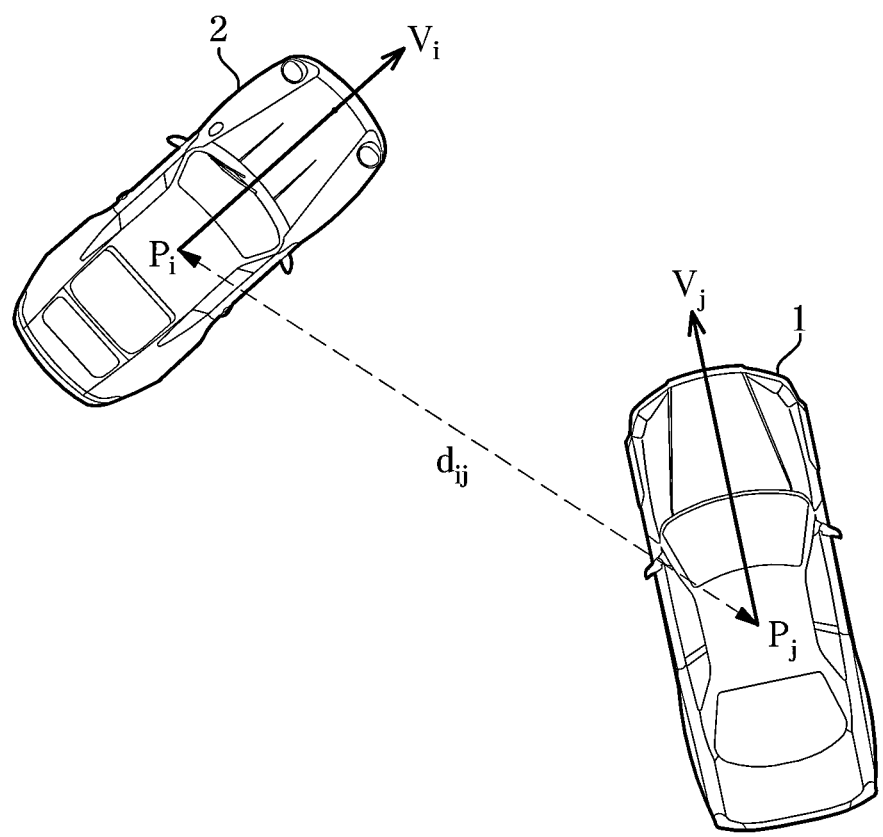
FIG. 5 is an exemplary diagram illustrating the obtaining of a position vector in a vehicle according to an embodiment.

As shown in FIG. 5, the processor 141 obtains a position vector quantity and a speed vector quantity for a position and a speed of the vehicle based on acquired traveling speed information and position information of the vehicle.

position vector quantity of vehicle: 1 $P_j=(X_j\ Y_j)$, and speed vector quantity: $V_j=(V_{xj}\ V_{yj})$ The processor 141 communicates with the other vehicle and obtains a position vector quantity and a speed vector quantity for a position and a speed of the other vehicle based on position information and traveling speed information of the other vehicle received from the other vehicle.

Based on front radar data detected by the front radar 120 and corner radar data detected by the corner radar 130, the processor 141 may acquire position information and speed information of the other vehicle 2 and may also acquire a position vector quantity and a speed vector quantity for a position and a speed of the other vehicle based on the acquired position information and traveling speed information of the other vehicle 2.

position vector quantity of other vehicle: 1 $P_i(X_i\ Y_i)$, and speed vector quantity of other vehicle: $V_i=(V_{xi}\ V_{yi})$ The processor 141 obtains a position vector leading from a position of the vehicle to a position of the other vehicle. That is, the processor 141 obtains a relative position vector quantity $d_{ij}$ based on a position vector quantity $P_i$ of the other vehicle 2, a velocity vector quantity $V_i$ of the other vehicle 2, a position vector quantity $P_j$ of the vehicle 1, and a speed vector quantity $V_j$ of the vehicle 1 as equation (1).

$$d_{ij}\|P_i-P_j\|^2=(P_i-P_j)^T(P_i-P_j) \quad (1)$$

The processor 141 obtains a speed vector through time differentiation for each component of the relative position vector quantity $d_{ij}$ as equation (2).

$$\dot{d}_{ij}=\|P_i-P_j\|^2=(P_i-P_j)^T(P_i-P_j) \quad (2)$$

The processor 141 obtains a two-dimensional TTC on a two-dimensional plane based on the relative position vector quantity and the speed vector quantity as equation (3).

$$d_{ij} + \dot{d}_{ij}T = 0, TTC = -\frac{d_{ij}}{\dot{d}_{ij}} \quad (3)$$

When a vehicle present at a position corresponding to the relative position vector quantity $d_{ij}$ obtained on the two-dimensional plane based on the relative position vector quantity and the speed vector quantity and the other vehicle move by an obtained speed vector quantity $d_{ij}'$, the processor 141 may obtain a remaining time (T=TTC) until the vehicle and the other vehicle collide with each other. Here, the remaining time is a two-dimensional TTC.

When the two-dimensional TTC exceeds a reference time, the processor 141 determines that a risk of collision between a nearby vehicle and a host vehicle is low, and when the two-dimensional TTC is less than or equal to the reference time, the processor 141 determines that a risk of collision between the nearby vehicle and the host vehicle is high.

Here, the reference time may differ according to a type of a road such as a highway, a national road, or a downtown road and a road environment such as a traffic condition.

The reference time that differs according to a type of a road and a road environment may be information that is preset and stored.

When it is determined that the risk of collision between the nearby vehicle and the host vehicle is high, the processor 141 determines whether there is an actual possibility of collision.

The processor 141 determines whether the nearby vehicle and the host vehicle are present on a collision path.

When a vehicle is traveling and a distance between the vehicle and the other vehicle in front is long, the other vehicle in front looks smaller in size to a user's eyes. When the distance to the other vehicle decreases, the other vehicle in front looks bigger in size to the user's eyes. As a traveling speed difference between the vehicle and the other vehicle in front decreases, the other vehicle in front appears to increase in size more rapidly to the user's eyes. That is, a rate of change in size of the vehicle in front becomes faster.

Such a phenomenon may also occur in image information acquired by the camera.

Figure 6A:
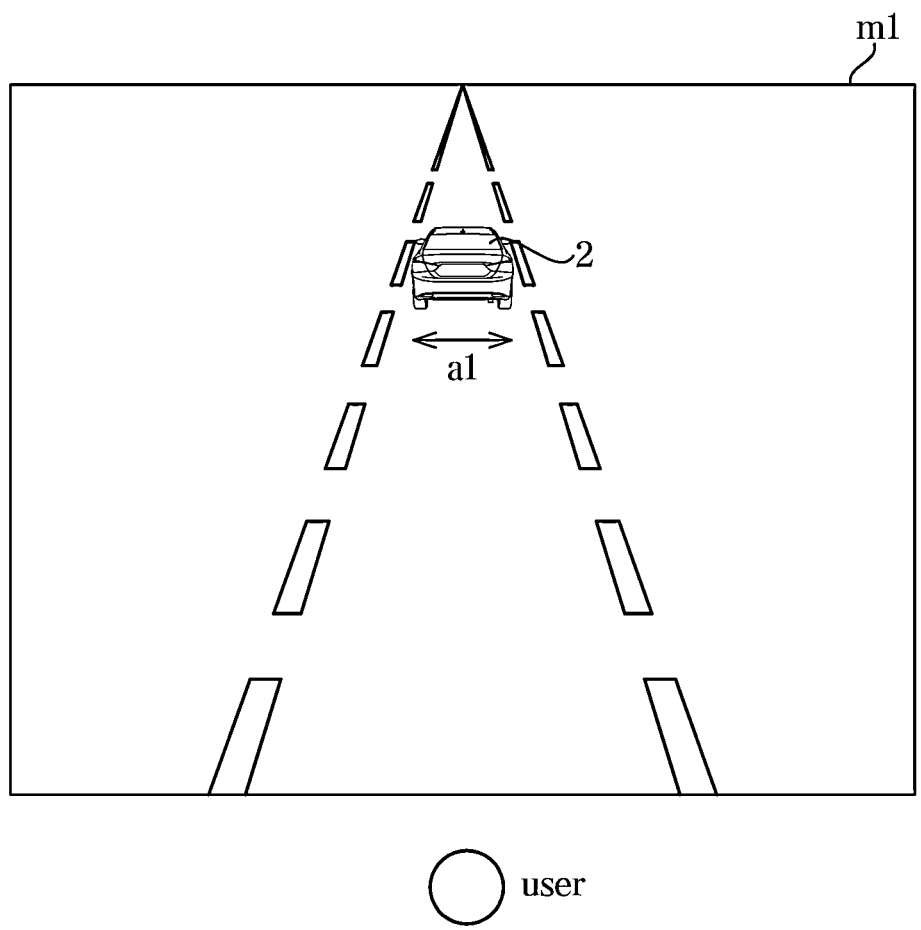
FIGS. 6A and 6B are diagrams illustrating the obtaining of looming in a driver assistance system provided in a vehicle according to an embodiment.
Figure 6B:
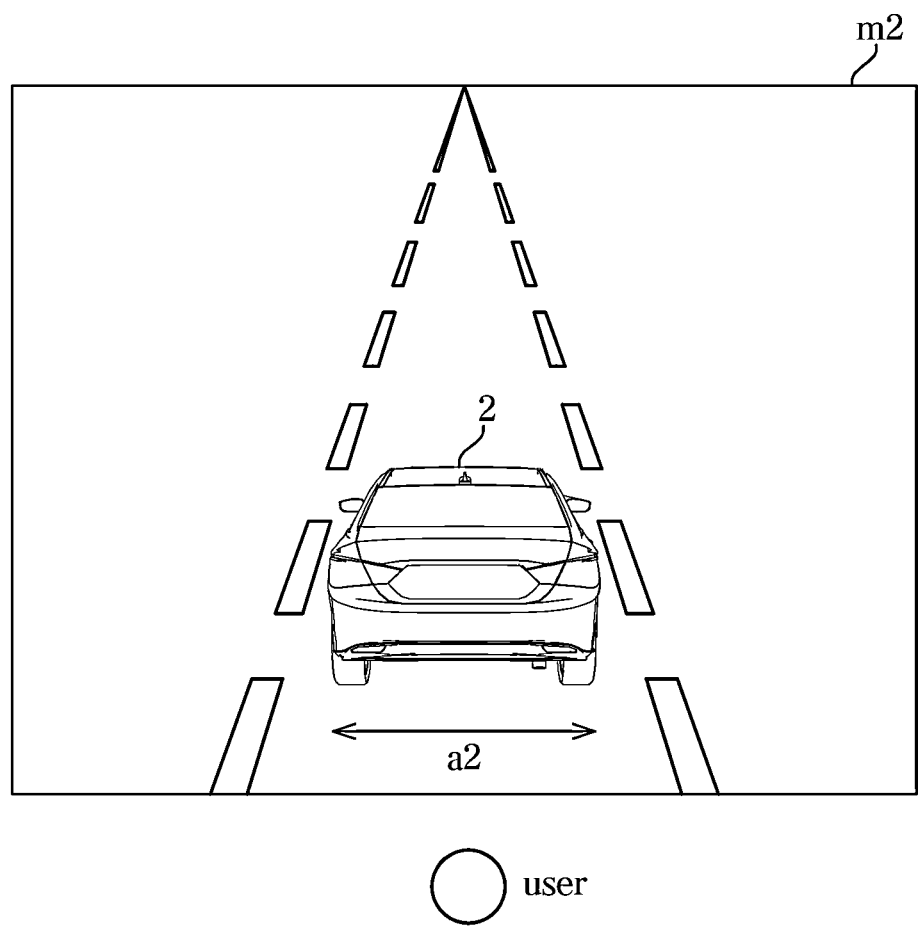

As shown in FIGS. 6A and 6B, when a vehicle is traveling and a distance between the vehicle and the other vehicle in front is long, a size (for example, a width a1) of the other vehicle in an image m1 acquired by a camera is small, and when a distance to the other vehicle decreases, the size (for example, a width a2) of the other vehicle in an image m2 acquired by a camera increases.

It can be seen that, as a traveling speed difference between a vehicle and the other vehicle in front decreases, a distance between the vehicle and the other vehicle in front decreases more rapidly, and thus a rate of change in size of the other vehicle in front in an image becomes larger.

Such a decrease in the rate of change in size of the other vehicle in an image means that a TTC time increases, and an increase in the rate of change in size of the other vehicle means that a distance to the other vehicle in front is decreasing, and thus a TTC decreases.

Here, a rate of change in size of a vehicle in front recognized by a user or a rate of change in size of a vehicle in front in an image acquired by a camera is referred to as looming.

The processor 141 acquires image information of the other vehicle based on image information of a road acquired by the camera and obtains a rate of change in size of an image of the other vehicle acquired in an image of the road.

That is, the processor 141 may acquire image information through the camera at a preset time interval and may obtain a rate of change in size of an image of the other vehicle based on the image information acquired at the preset time interval. That is, the processor 141 obtains looming information.

The processor 141 may communicate with the other vehicle and may obtain relative bearing information based on position information of the other vehicle received from the other vehicle and position information of the vehicle received by the position receiver.

Based on front radar data detected by the front radar 120 and corner radar data detected by the corner radar 130, the processor 141 acquires position information of the other vehicle 2 and acquires relative bearing information based on the acquired position information of the other vehicle.

Here, the position information of the other vehicle 2 may include distance information about a distance to the other vehicle and direction information of the other vehicle. The distance information about the distance to the other vehicle and the direction information may be distance information about a relative distance to the other vehicle and direction information about a relative direction.

The processor 141 determines whether the other vehicle and the vehicle are present on a collision path based on a rate of change in size of an image of the other vehicle and relative bearing information, determines that there is an actual possibility of collision when it is determined that the other vehicle and the vehicle are on the collision path, and determines that there is no actual possibility of collision when it is determined that the other vehicle and the vehicle are not present on the collision path.

The processor 141 may recognize an image of the other vehicle based on image information acquired by the front camera 110, may check a position of a traveling-direction-indicating lamp and power of the traveling-direction-indicating lamp from the recognized image of the other vehicle, and may also acquire traveling direction information of the other vehicle based on the checked position of the traveling-direction-indicating lamp and the checked power of the traveling-direction-indicating lamp.

The processor 141 may also acquire traveling direction information of the other vehicle based on information of the other vehicle received through the communicator 143.

The processor 141 may check lane information for each lane based on map information and road information and may also acquire traveling direction information of another for each lane based on the lane information for each lane.

The processor 141 may also acquire lane information about a lane in which a host vehicle is positioned based on map information, road information, and image information.

The processor 141 may acquire lane information about a lane in which a host vehicle is positioned based on path information about a path to a destination and may acquire traveling direction information of the host vehicle based on a signal from a traveling-direction-indicating lever or power information of the traveling-direction-indicating lamp.

Based on traveling direction information of the other vehicle, lane information of the other vehicle, lane information of a host vehicle, traveling direction information of the host vehicle, relative bearing information, and a rate of change in size of an image of the other vehicle, the processor 141 may also determine whether the other vehicle and the vehicle are present on a collision path.

The processor 141 obtains a rate of change in size of an image of the other vehicle based on image information acquired by the front camera 110, and when it is determined that the obtained rate of change in size of the image of the other vehicle is greater than or equal to a reference rate of change, the processor 141 acquires relative bearing information of the other vehicle 2 with respect to a position of the vehicle 1 based on front radar data detected by the front radar 120 and corner radar data detected by the corner radar 130.

In the following description, it will be assumed that front is north, rear is south, right is east, and left is west.

Figure 7A:
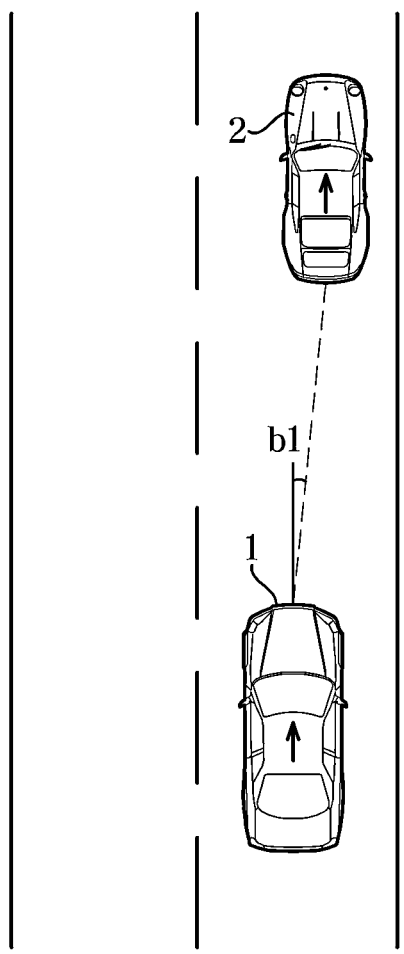
FIGS. 7A, 7B, 7C, 7D, and 7E are diagrams illustrating the determination of a collision path in a vehicle according to an embodiment.

As shown in FIG. 7A, when a first angle b1 toward the northeast is obtained as relative bearing information of the other vehicle 2 with respect to a center position of the vehicle 1, the processor 141 may determine whether the obtained relative bearing information is included in reference bearing information, and when it is determined that the relative bearing information is included in the reference bearing information, the processor 141 may determine that the vehicle and the other vehicle are present on a collision path.

Here, the reference bearing information is bearing information for determining a possibility that the vehicle 1 and the other vehicle 2 are traveling in the same lane and may be bearing information within a range in which a collision is possible.

For example, the reference bearing information may include a first reference angle toward the northeast and a second reference angle toward the northwest. Here, the first reference angle and the second reference angle may be the same or different.

That is, when it is determined that the first angle b1 is less than or equal to the first reference angle, the processor 141 may determine that the vehicle and the other vehicle are present on the collision path.

Figure 7B:
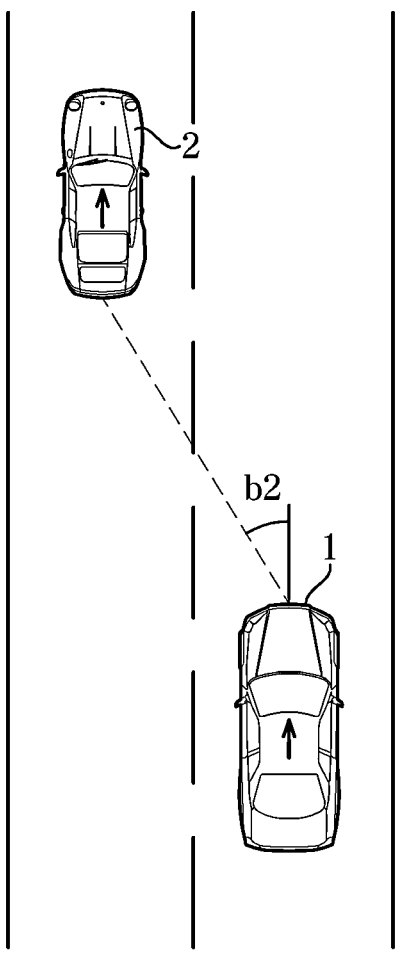

As shown in FIG. 7B, when a second angle b2 toward the northwest is obtained as relative bearing information of the other vehicle 2 with respect to a center position of the vehicle 1, the processor 141 may determine whether the obtained relative bearing information is included in reference bearing information, and when it is determined that the relative bearing information is included in the reference bearing information, the processor 141 may determine that the vehicle and the other vehicle are not present on a collision path.

That is, when it is determined that the second angle b2 is greater than or equal to the second reference angle, the processor 141 may determine that the vehicle and the other vehicle are not present on the collision path.

Figure 7C:
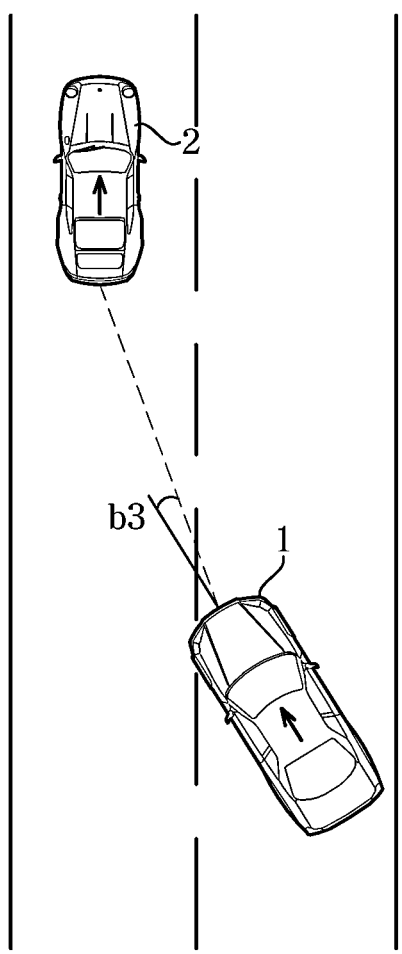

As shown in FIG. 7C, when a third angle b3 toward the northwest is obtained as relative bearing information of the other vehicle 2 with respect to a center position of the vehicle 1, the processor 141 may determine whether the obtained relative bearing information is included in reference bearing information, and when it is determined that the relative bearing information is included in the reference bearing information, the processor 141 may determine that the vehicle and the other vehicle are present on a collision path.

Figure 7D:
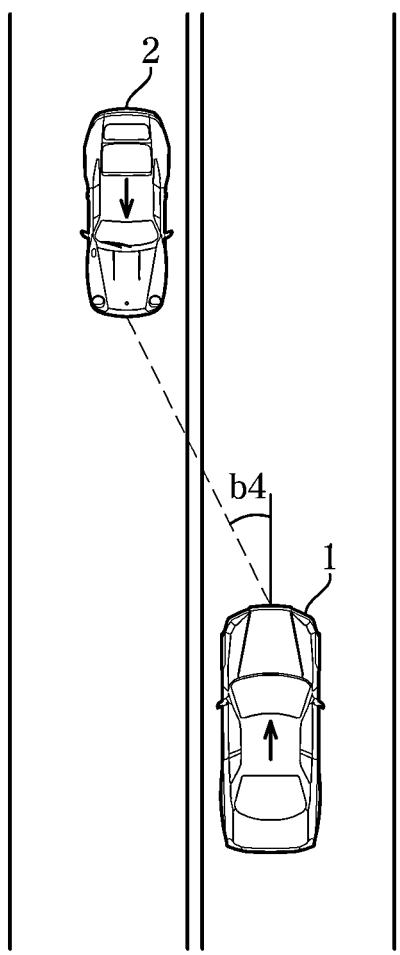

As shown in FIG. 7D, when a fourth angle b4 toward the northwest is obtained as relative bearing information of the other vehicle 2 with respect to a center position of the vehicle 1, the processor 141 may determine whether the obtained relative bearing information is included in reference bearing information, when it is determined that the relative bearing information is included in the reference bearing information, the processor 141 may further check a traveling direction and a traveling lane of a host vehicle and a traveling direction and a traveling lane of the other vehicle, and when it is determined that the host vehicle and the other vehicle are traveling in different driving lanes based on the traveling direction and the traveling lane of the host vehicle and the traveling direction and the traveling lane of the other vehicle, and at the same time, the traveling directions are different, the processor 141 may determine that the vehicle and the other vehicle are not present on a collision path.

Figure 7E:
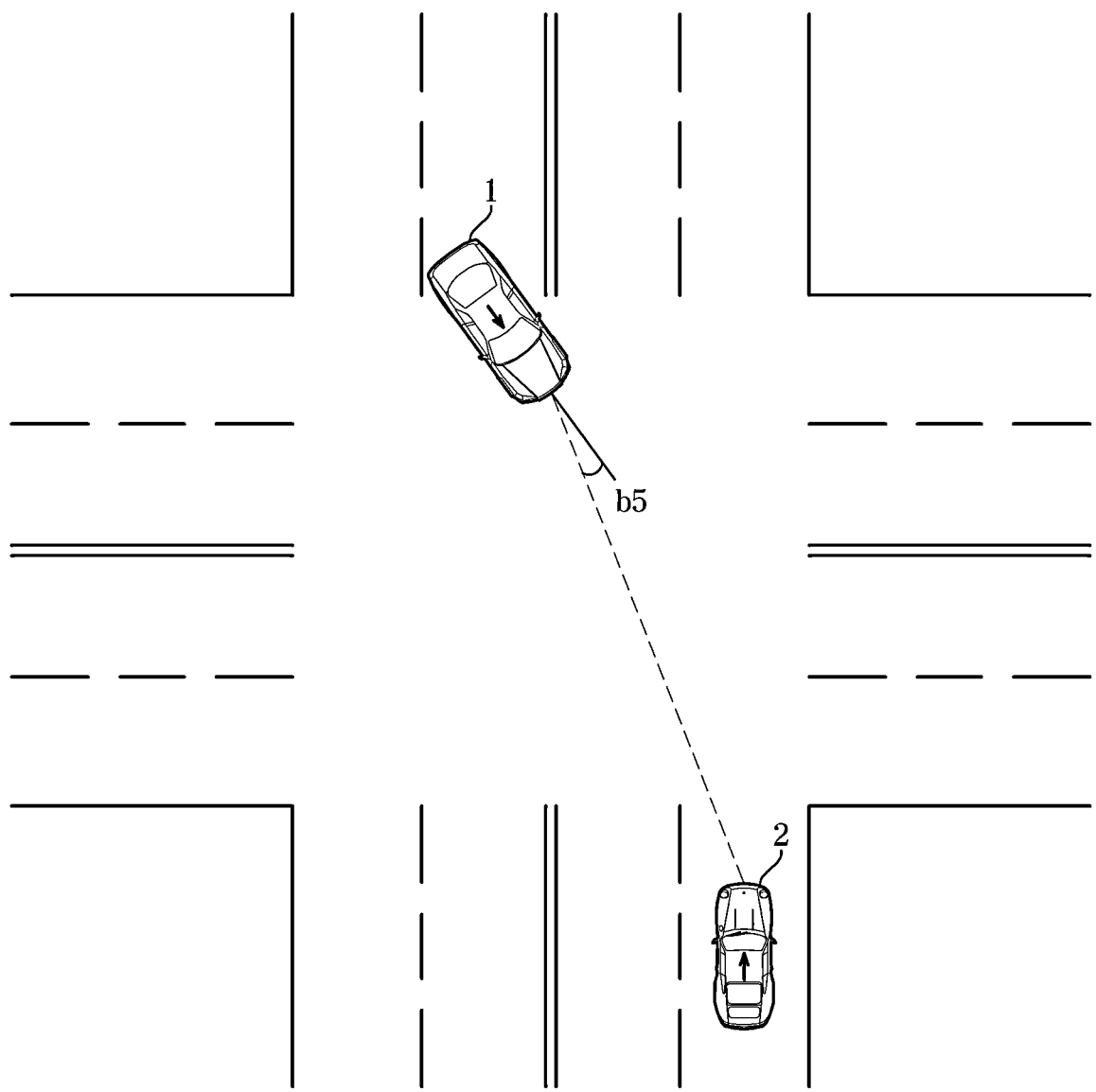

As shown in FIG. 7E, when a fifth angle b5 toward the northeast is obtained as relative bearing information of the other vehicle 2 with respect to a center position of the vehicle 1, the processor 141 may determine whether the obtained relative bearing information is included in reference bearing information, and when it is determined that the relative bearing information is included in the reference bearing information, the processor 141 may determine that the vehicle and the other vehicle are present on a collision path.

When a traveling direction of a host vehicle changes, the processor 141 may further check the traveling direction of the host vehicle, a lane of the host vehicle, a traveling direction of the other vehicle, and a lane of the other vehicle and may determine whether there is a possibility that the host vehicle and the other vehicle are traveling in the same lane based on the traveling direction of the host vehicle, the lane of the host vehicle, the traveling direction of the other vehicle, and the lane of the other vehicle, and when it is determined that there is a possibility that the host vehicle and the other vehicle are traveling in the same lane, the processor 141 may determine that the vehicle and the other vehicle are present on a collision path.

When it is determined that there is another traveling vehicle from relative bearing information included in reference bearing information when a rate of change in size of an image of the other vehicle is greater than a reference rate of change, the processor 141 may determine that a host vehicle and the other vehicle are present on a collision path before a reference time elapses from a current time point.

During a manual driving mode, when it is determined that a two-dimensional TTC is less than or equal to a reference time and the other vehicle and a vehicle are present on a collision path, the processor 141 determines that there is an actual possibility of collision and controls the output of a collision risk warning.

During a manual driving mode, when it is determined that a two-dimensional TTC is less than or equal to the reference time but the other vehicle and a vehicle are not present on a collision path, the processor 141 determines that there is no actual possibility of collision and limits the output of a collision risk warning.

During an autonomous driving mode, when it is determined that a two-dimensional TTC is less than or equal to the reference time and the other vehicle and a vehicle are present on a collision path, the processor 141 may determine that there is an actual possibility of collision and may control avoidance and deceleration.

During an autonomous driving mode, when it is determined that a two-dimensional TTC is less than or equal to the reference time but the other vehicle and a vehicle are not present on a collision path, the processor 141 may determine that there is no actual possibility of collision and may limit avoidance and deceleration control.

Thus, in order to respond to nearby vehicles performing various movements, it is possible to increase the accuracy of determining a possibility of collision between a host vehicle and the other vehicle even on a downtown road, and it is possible to prevent the occurrence of a false warning and false braking with respect to a collision with the other vehicle.

The processor 141 may be implemented as one processor.

The processor 141 may include a memory (not shown) which stores an algorithm for executing the operation of the DAS 100 or data for a program reproducing the algorithm and a processor which performs the above-described operation using data stored in the memory.

The processor 141 may include a memory (not shown) which stores an algorithm for controlling the operation of the components in the vehicle 1 or data for a program reproducing the algorithm and a processor which performs the above-described operation using data stored in the memory. In this case, the memory and the processor may each be implemented as a separate chip. Alternatively, the memory and the processor may each be implemented as a single chip.

The memory 142 may store programs and/or data for processing image data by the processor 141, programs and/or data for processing radar data by the processor 141, and programs and/or data for generating an acceleration signal, a braking signal, and/or a steering signal by the processor 141.

The memory 142 may temporarily store image data received from the front camera 110 and/or radar data received from the radars 120 and 130 and may temporarily store processing results of image data and/or radar data by the processor 141.

The memory 142 and the processor 141 may each be implemented as a separate chip. Alternatively, the memory 142 and the processor 141 may be implemented as a single chip.

The memory 142 may store information about a reference time and information about a reference rate of change.

Here, the reference time may differ according to a type of a road such as a highway, a national road, or a downtown road and a road environment such as a traffic condition.

The memory 142 may store a plurality of reference times set to correspond to a type of a road and a road environment.

The memory 142 may store information about a target traveling speed. Here, the target traveling speed may be a preset traveling speed, a traveling speed set during manufacturing of a vehicle, or a traveling speed set by a user.

The memory 142 may store information about a type and a size of a sound corresponding to a collision risk warning.

The memory 142 may store braking force information corresponding to a distance until a collision with an obstacle and braking force information corresponding to a time until a collision with an obstacle.

The memory 142 may be implemented with at least one of non-volatile memories such as a cache, a ROM, a programmable ROM (PROM), an EPROM, an electrically erasable programmable ROM (EEPROM), and a flash memory, a volatile memory such as a random access memory (RAM), and storage media such as a hard disk drive (HDD) and a CD-ROM, but the present disclosure is not limited thereto.

Figure 8:
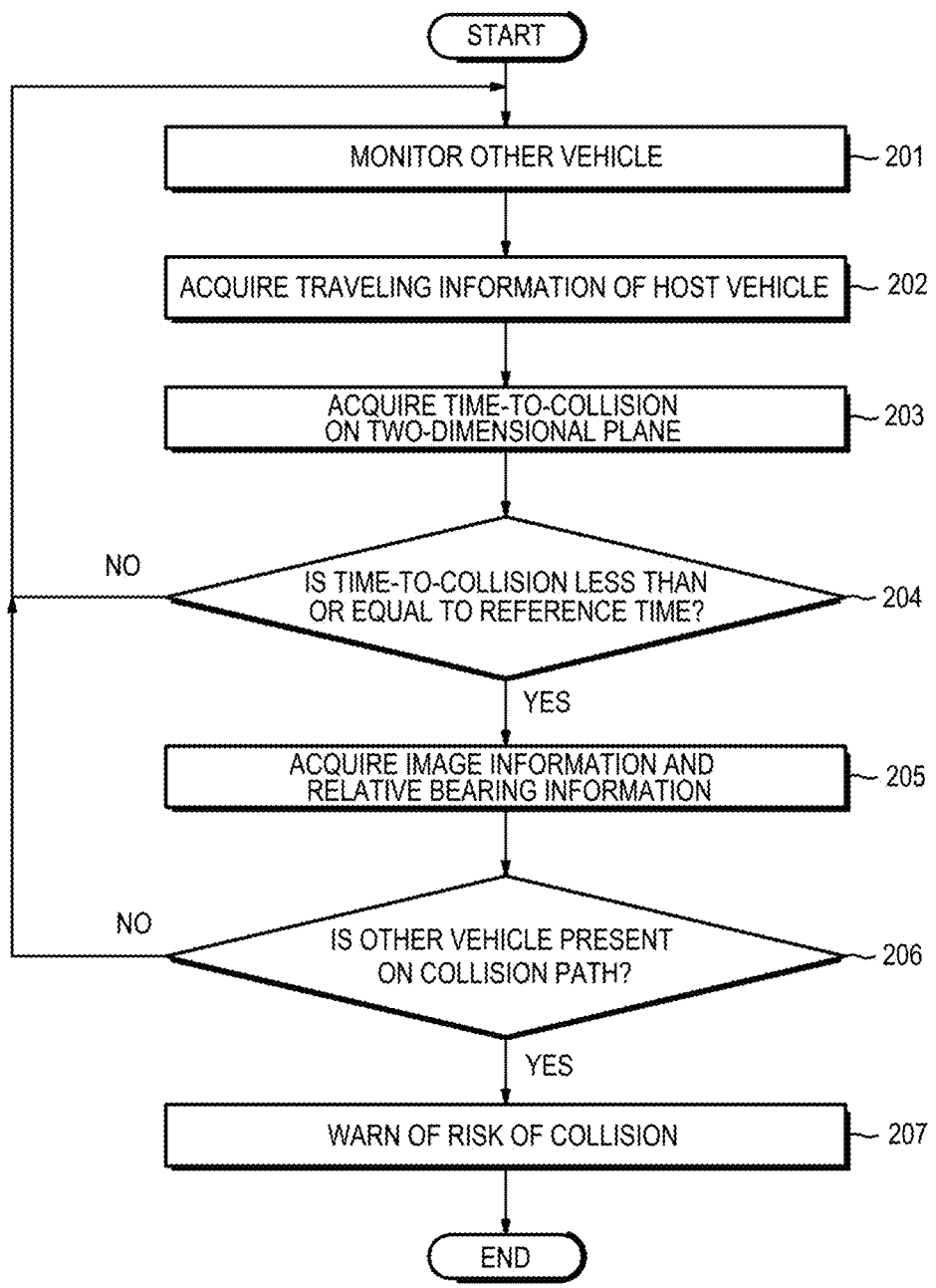
FIG. 8 is a control flowchart of a driver assistance system provided in a vehicle according to an embodiment.

FIG. 8 is a control flowchart of a DAS provided in a vehicle according to an embodiment.

A DAS 100 monitors the other vehicle traveling near a vehicle (201) and acquires traveling speed information and position information of the other vehicle based on monitored information.

As an example, the DAS 100 communicates with the other vehicle and obtains a position vector quantity and a speed vector quantity for a position and a speed of the other vehicle based on the position information and the traveling speed information of the other vehicle received from the other vehicle.

As another example, based on front radar data detected by a front radar 120 and corner radar data detected by a corner radar 130, the DAS 100 may acquire position information and speed information of the other vehicle 2 and may also acquire a position vector quantity and a speed vector quantity for the position and the speed of the other vehicle based on the acquired position information and traveling speed information of the other vehicle 2.

The DAS 100 acquires traveling information of the vehicle (202).

That is, the DAS 100 acquires traveling speed information of the vehicle based on speed information detected by a speed detector 161 and acquires position information of the vehicle based on position information received by a position receiver.

The DAS 100 obtains a position vector quantity and a speed vector quantity for a position and a speed of the vehicle based on the acquired traveling speed information of the vehicle and the position information of the vehicle.

That is, the DAS 100 obtains a relative position vector quantity $d_{ij}$ based on a position vector quantity $P_i$ of the other vehicle 2, a velocity vector quantity $V_i$ of the other vehicle 2, a position vector quantity $P_j$ of the vehicle 1, and a speed vector quantity $V_j$ of the vehicle 1 as equation (4).

$$d_{ij} \| P_i - P_j \|^2 = (P_i - P_j)^T (P_i - P_j) \qquad (4)$$

The DAS 100 obtains a speed vector through time differentiation for each component of the relative position vector quantity $d_{ij}$ as equation (5).

$$\dot{d}_{ij} \frac{1}{d_{ij}} (P_i - P_j)^T (V_i - V_j) \qquad (5)$$

The DAS 100 obtains a two-dimensional TTC on a two-dimensional plane based on the relative position vector quantity and the speed vector quantity as equation (6).

$$d_{ij} + \dot{d}_{ij} T = 0, \ TTC = -\frac{d_{ij}}{\dot{d}_{ij}} \qquad (6)$$

When a vehicle present at a position corresponding to the relative position vector quantity $d_{ij}$ obtained on the two-dimensional plane based on the relative position vector quantity and the speed vector quantity and the other vehicle move by an obtained speed vector quantity $d_{ij}'$, the DAS 100 may obtain a remaining time (T=TTC) until the vehicle and the other vehicle collide with each other (203). Here, the remaining time is a two-dimensional TTC.

The DAS 100 determines whether the two-dimensional TTC is less than or equal to a reference time (204), and when it is determined that the two-dimensional TTC exceeds the reference time, the DAS 100 determines that a risk of collision between a nearby vehicle and a host vehicle is low.

When it is determined that the two-dimensional TTC is less than or equal to the reference time, the DAS 100 determines that a risk of collision between the nearby vehicle and the host vehicle is high and determines whether there is an actual possibility of collision.

In this case, the DAS 100 acquires image information of a road acquired by a front camera and relative bearing information with respect to the other vehicle. This will be described in more detail.

The DAS 100 acquires image information of the other vehicle based on the image information of the road acquired by the front camera and obtains a rate of change in size of an image of the other vehicle acquired in an image of the road. Here, a rate of change in size of the other vehicle in the image acquired by the front camera is referred to as looming.

That is, the DAS 100 may acquire image information through the camera at a preset time interval and may obtain the rate of change in size of the image of the other vehicle based on the image information acquired at the preset time interval.

The DAS 100 may communicate with the other vehicle and may obtain relative bearing information based on position information of the other vehicle received from the other vehicle and position information of the vehicle received by the position receiver.

Based on front radar data detected by the front radar 120 and corner radar data detected by the corner radar 130, the DAS 100 may acquire the position information of the other vehicle 2 and may also acquire relative bearing information based on the acquired position information of the other vehicle.

Here, the position information of the other vehicle 2 may include distance information about a distance to the other vehicle and direction information of the other vehicle. The distance information about the distance to the other vehicle and the direction information may be distance information about a relative distance to the other vehicle and direction information about a relative direction.

The DAS 100 determines whether the other vehicle and the vehicle are present on a collision path based on the rate of change in size of the image of the other vehicle and the relative bearing information (206), determines that there is an actual possibility of collision when it is determined that the other vehicle and the vehicle are on the collision path, and determines that there is no actual possibility of collision when it is determined that the other vehicle and the vehicle are not present on the collision path.

That is, when it is determined that there is another traveling vehicle from the relative bearing information included in reference bearing information when the rate of change in size of the image of the other vehicle is greater than a reference rate of change, the DAS 100 may determine that the host vehicle and the other vehicle are present on the collision path before a reference time elapses from a current time point.

During a manual driving mode, when it is determined that the two-dimensional TTC is less than or equal to the reference time and the other vehicle and the vehicle are present on the collision path, the DAS 100 determines that there is an actual possibility of collision and outputs a collision risk warning.

During the manual driving mode, when it is determined that the two-dimensional TTC is less than or equal to the reference time but the other vehicle and the vehicle are not present on the collision path, the DAS 100 determines that there is no actual possibility of collision and limits the output of a collision risk warning.

During an autonomous driving mode, when it is determined that the two-dimensional TTC is less than or equal to the reference time and the other vehicle and the vehicle are present on the collision path, the DAS 100 may determine that there is an actual possibility of collision and may control avoidance and deceleration.

During the autonomous driving mode, when it is determined that the two-dimensional TTC is less than or equal to the reference time and the other vehicle and the vehicle are not present on the collision path, the DAS 100 may determine that there is no actual possibility of collision and may limit avoidance and deceleration control.

Thus, in order to respond to nearby vehicles performing various movements, it is possible to increase the accuracy of determining a possibility of collision between a host vehicle and the other vehicle even on a downtown road, and it is possible to prevent the occurrence of a false warning and false braking with respect to a collision with the other vehicle.

In addition, the DAS 100 may recognize an image of the other vehicle based on image information acquired by the front camera 110, may check a position of a traveling-direction-indicating lamp and power of the traveling-direction-indicating lamp from the recognized image of the other vehicle, and may also acquire traveling direction information of the other vehicle based on the checked position of the traveling-direction-indicating lamp and the checked power of the traveling-direction-indicating lamp.

The DAS 100 may also acquire traveling direction information of the other vehicle based on information of the other vehicle received through a communicator 143.

The DAS 100 may check lane information for each lane based on map information and road information and may also acquire traveling direction information of the other vehicle for each lane based on the lane information for each lane.

The DAS 100 may also acquire lane information about a lane in which a host vehicle is positioned based on map information, road information, and image information.

The DAS 100 may acquire lane information about a lane in which a host vehicle is positioned based on path information about a path to a destination and may acquire traveling direction information of the host vehicle based on a signal from a traveling-direction-indicating lever or power information of the traveling-direction-indicating lamp.

Based on traveling direction information of the other vehicle, lane information of the other vehicle, lane information of a host vehicle, traveling direction information of the host vehicle, relative bearing information, and a rate of change in size of an image of the other vehicle, the DAS 100 may also determine whether the other vehicle and the vehicle are present in a collision path.

The DAS 100 obtains a rate of change in size of the image of the other vehicle based on image information acquired by the front camera 110, and when it is determined that the obtained rate of change in size of the image of the other vehicle is greater than or equal to a reference rate of change, the DAS 100 acquires relative bearing information of the other vehicle 2 with respect to a position of the vehicle 1 based on front radar data detected by the front radar 120 and corner radar data detected by the corner radar 130.

The DAS 100 may determine whether obtained relative bearing information is included in reference bearing information, when it is determined that the relative bearing information is included in the reference bearing information, the DAS 100 may further check a traveling direction and a traveling lane of a host vehicle and a traveling direction and a traveling lane of the other vehicle, and when it is determined that the host vehicle and the other vehicle are traveling in different driving lanes based on the traveling direction and the traveling lane of the host vehicle and the traveling direction and the traveling lane of the other vehicle, and at the same time, the traveling directions are different, the DAS 100 may determine that the vehicle and the other vehicle are not present on a collision path.

The DAS 100 may determine whether obtained relative bearing information is included in reference bearing information, and when it is determined that the relative bearing information is included in the reference bearing information, the DAS 100 may primarily determine that a vehicle and the other vehicle are not present on a collision path.

When a traveling direction of a host vehicle changes, the DAS 100 may obtain an expected lane of the host vehicle corresponding to the traveling direction of the host vehicle, may obtain an expected lane of the other vehicle corresponding to a traveling direction of the other vehicle, and may determine whether there is a possibility that the host vehicle and the other vehicle are traveling in the same lane based on the expected lane of the host vehicle and the expected lane of the other vehicle, and when it is determined that there is a possibility that the host vehicle and the other vehicle are traveling in the same lane, the DAS 100 may secondarily determine that the host vehicle and the other vehicle are present on a collision path.

According to the present disclosure, by determining an actual possibility of collision with an obstacle based on a TTC on a two-dimensional plane and the presence or absence of a collision path, it is possible to increase the accuracy of determining a possibility of collision with an obstacle performing various movements on a downtown road, thereby improving response performance for responding to a risk of collision.

In addition, according to the present disclosure, an avoidance path is generated based on a possibility of collision with an obstacle, thereby securing the safety of a DAS.

According to the present disclosure, it is possible to improve autonomous driving performance and stability during autonomous driving.

According to the present disclosure, it is possible to quickly and safely avoid nearby obstacles in a state in which a hardware component is not added, thereby preventing a rise in costs of a vehicle and also improving the utilization of a DAS.

In this way, according to the present disclosure, it is possible to improve the quality and marketability of a DAS and a vehicle including the DAS, and furthermore, it is possible to increase user satisfaction and to secure product competitiveness.

Meanwhile, the disclosed embodiments can be implemented with recording media storing computer-executable instructions. The instructions can be stored in the form of program code and generate, when executed by a processor, a program module such that the operation of the disclosed embodiments can be performed. The recording media can be implemented as computer-readable recording media.

The computer-readable recording media include all types of recording media in which instructions that can be interpreted by a computer are stored. Examples of the computer-readable recording media include a ROM, a RAM, a magnetic tape, a magnetic disk, a flash memory, an optical data storage device, and the like.

The disclosed embodiments have been described above with reference to the accompanying drawings. Those of ordinary skill in the art to which the present disclosure pertains will appreciate that the present disclosure can be carried out in forms different from the disclosed embodiments without changing the technical spirit or essential characteristics of the present disclosure. The disclosed embodiments are exemplary and should not be interpreted as restrictive.

What is claimed is:

1. A driver assistance system comprising:
    a camera;
    an obstacle detector comprising at least one of a radar, a LiDAR sensor, or an ultrasonic sensor configured to detect an obstacle and output obstacle information about the detected obstacle; and
    a processor configured to:
        recognize an image of the obstacle based on image information acquired by the camera,
        obtain a rate of change in size of the recognized image of the obstacle based on a distance from the obstacle or a traveling speed difference,
        obtain relative bearing information of the obstacle based on the obstacle information detected by the obstacle detector,
        determine whether the obstacle and a vehicle are present on a collision path based on the obtained rate of change in size of the image of the obstacle and the relative bearing information of the obstacle, and
        output a collision risk warning upon determining that the vehicle and the obstacle are present on the collision path,
    wherein the processor controls at least one of a traveling speed and a traveling direction upon determining that the vehicle and the obstacle are present on the collision path during an autonomous driving mode.

2. The driver assistance system of claim 1, further comprising a communicator,
    wherein the processor is configured to:
    check position information of the vehicle and traveling speed information of the vehicle received by the communicator,
    obtain position information and speed information of the obstacle based on the obstacle information detected by the obstacle detector, and
    obtain a time-to-collision based on the traveling speed information of the vehicle, the position information of the vehicle, and the position information and the speed information of the obstacle.

3. The driver assistance system of claim 2, wherein the time-to-collision is a time-to-collision on a two-dimensional plane.

4. The driver assistance system of claim 3, wherein the processor is configured to:

obtain a position vector and a speed vector of the vehicle based on the traveling speed information of the vehicle and the position information of the vehicle, obtain a position vector and a speed vector of the obstacle based on the position information and the speed information of the obstacle, obtain a relative position vector based on the position vector of the vehicle, the speed vector of the vehicle, the position vector of the obstacle, and the speed vector of the obstacle, obtain a relative speed vector based on the obtained relative position vector, and obtain the time-to-collision on the two-dimensional plane based on the obtained relative speed vector and the relative position vector.

5. The driver assistance system of claim 4, wherein, the processor is configured to determine whether the obstacle and the vehicle are present on the collision path based on a time-to-collision being less than or equal to a reference collision time.

6. The driver assistance system of claim 4, wherein:
the processor is configured to determine whether the rate of change in size of the recognized image of the obstacle is greater than or equal to a reference rate of change based on a time-to-collision being less than or equal to a reference collision time; and
the processor is configured to obtain the relative bearing information of the obstacle upon determining that the rate of change in size of the recognized image of the obstacle is greater than or equal to the reference rate of change.

7. The driver assistance system of claim 6, wherein the processor is configured to determine that the vehicle and the obstacle are present on the collision path based on a relative bearing information of the obstacle being included in reference bearing information.

8. The driver assistance system of claim 6, wherein the processor is configured to determine that the vehicle and the obstacle are not present on the collision path and limits the collision risk warning based on a relative bearing information of the obstacle being not included in reference bearing information.

9. A vehicle comprising:
a display;
a sound output unit;
a camera;
an obstacle detector comprising at least one of a radar, a LiDAR sensor, or an ultrasonic sensor configured to detect an obstacle and output obstacle information about the detected obstacle; and
a processor configured to:
recognize an image of the obstacle based on image information acquired by the camera,
obtain a rate of change in size of the recognized image of the obstacle based on a distance from the obstacle or a traveling speed difference,
obtain relative bearing information of the obstacle based on the obstacle information detected by the obstacle detector,
determine whether the obstacle and a vehicle are present on a collision path based on the obtained rate of change in size of the image of the obstacle and the relative bearing information of the obstacle, and
control at least one of the display and the sound output unit to output a collision risk warning upon determining that the vehicle and the obstacle are present on the collision path.

10. The vehicle of claim 9, further comprising:
a speed detector comprising at least one of a wheel speed sensor, or an acceleration sensor configured to detect a traveling speed; and
a communicator configured to receive current position information,
wherein the processor is configured to:
check position information of the vehicle and traveling speed information of the vehicle received by the communicator,
obtain position information and speed information of the obstacle based on the obstacle information detected by the obstacle detector, and
obtain a time-to-collision based on the traveling speed information of the vehicle, the position information of the vehicle, and the position information and the speed information of the obstacle.

11. The vehicle of claim 9, further comprising:
a speed detector comprising at least one of a wheel speed sensor, or an acceleration sensor configured to detect a traveling speed; and
a communicator configured to receive current position information and communicate with the obstacle,
wherein the processor is configured to obtains a time-to-collision based on position information and speed information of the obstacle, traveling speed information of the vehicle, and position information of the vehicle which are received by the communicator.

12. The vehicle of claim 11, wherein, upon obtaining the time-to-collision, the processor is configured to:
obtain a position vector and a speed vector of the vehicle based on the traveling speed information of the vehicle and the position information of the vehicle,
obtain a position vector and a speed vector of the obstacle based on the position information and the speed information of the obstacle,
obtain a relative position vector based on the position vector of the vehicle, the speed vector of the vehicle, the position vector of the obstacle, and the speed vector of the obstacle,
obtain a relative speed vector based on the obtained relative position vector, and
obtain the time-to-collision on a two-dimensional plane based on the obtained relative speed vector and the relative position vector.

13. The vehicle of claim 11, wherein the processor is configured to determine whether the obstacle and the vehicle are present on the collision path based on a time-to-collision being less than or equal to a reference collision time.

14. The vehicle of claim 13, wherein the processor is configured to determine whether the rate of change in size of the recognized image of the obstacle is greater than or equal to a reference rate of change based on a time-to-collision being less than or equal to the reference collision time; and
the processor is configured to obtain the relative bearing information of the obstacle upon determining that the rate of change in size of the recognized image of the obstacle is greater than or equal to the reference rate of change.

15. The vehicle of claim 14, wherein the processor is configured to determine that the vehicle and the obstacle are present on the collision path based on a relative bearing information of the obstacle being included in reference bearing information.

16. The vehicle of claim 15, wherein the processor is configured to determine that the vehicle and the obstacle are not present on the collision path and limits the collision risk warning based on a relative bearing information of the obstacle being not included in the reference bearing information.

17. The vehicle of claim 15, further comprising a steering angle detector comprising an angular speed detector configured to detect a steering angle,
wherein the processor is configured to:
obtain a traveling direction of the obstacle received by the communicator,
obtain a traveling direction of the vehicle based on information detected by the steering angle detector,
determine whether the traveling direction of the vehicle and the traveling direction of the obstacle are the same based on a relative bearing information of the obstacle being included in the reference bearing information, and
determine that the obstacle is not present on the collision path based on a traveling direction of the vehicle being different from the traveling direction of the obstacle.

18. The vehicle of claim 15, further comprising a steering angle detector comprising an angular speed detector configured to detect a steering angle,
wherein the processor is configured to:
obtain a traveling direction of the obstacle received by the communicator,
obtain a traveling direction of the vehicle based on information detected by the steering angle detector,
determine whether an expected lane corresponding to the traveling direction of the vehicle and an expected lane corresponding to the traveling direction of the obstacle are the same based on a relative bearing information of the obstacle being included in the reference bearing information; and
determine that the obstacle is present on the collision path upon determining that the expected lane of the vehicle and the expected lane of the obstacle are the same.

19. The vehicle of claim 9, further comprising:
a steering device; and
a braking device,
wherein the processor is configured to control at least one of the steering device and the braking device upon determining that the vehicle and the obstacle are present on the collision path during an autonomous driving mode.

* * * * *